(12) United States Patent
Lin et al.

(10) Patent No.: US 9,802,359 B2
(45) Date of Patent: *Oct. 31, 2017

(54) METHOD FOR PRODUCING AN INFLATABLE PRODUCT

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 38 days.

This patent is subject to a terminal disclaimer.

(21) Appl. No.: 14/444,453

(22) Filed: Jul. 28, 2014

(65) Prior Publication Data

US 2014/0332142 A1   Nov. 13, 2014

Related U.S. Application Data

(63) Continuation of application No. PCT/US2012/042079, filed on Jun. 12, 2012.

(30) Foreign Application Priority Data

Mar. 2, 2012   (CN) .......................... 2012 1 0053143
Mar. 2, 2012   (CN) .......................... 2012 1 0053146

(Continued)

(51) Int. Cl.
*B29C 65/02*   (2006.01)
*B29C 65/00*   (2006.01)
(Continued)

(52) U.S. Cl.
CPC .......... *B29C 66/474* (2013.01); *A47C 27/081* (2013.01); *A47C 27/087* (2013.01);
(Continued)

(58) Field of Classification Search
CPC ..................................................... B29C 65/02
(Continued)

(56) References Cited

U.S. PATENT DOCUMENTS 245,881 A   8/1881   Snyder
486,696 A   11/1892   Curlin
(Continued)

FOREIGN PATENT DOCUMENTS

CH   197243   4/1938
CH   438 622   12/1967
(Continued)

OTHER PUBLICATIONS

Intex Recreaction Corp., Ultra Frame Pool, Enjoy the Ultimate Stay-cation!, poster, 2009, 1 page, USA.
(Continued)

*Primary Examiner* — Jeff Aftergut
(74) *Attorney, Agent, or Firm* — Faegre Baker Daniels LLP

(57) ABSTRACT

An internal tensioning structure for use in an inflatable product fulfills the basic function of maintaining two adjacent inflatable surfaces in a desired geometric arrangement when the inflatable product is pressurized. The tensioning structure is formed by connecting a pair of plastic strips sheets via spaced-apart strands, such as strings or wires. When pulled taut, the strands provide a high tensile strength between the two opposed plastic strips. At the same time, the plastic strips facilitate a strong, long-lasting weld between the tensioning structure and the inflatable product.

209 Claims, 28 Drawing Sheets

(30) Foreign Application Priority Data

Mar. 2, 2012 (CN) .......................... 2012 2 0075738
Mar. 2, 2012 (CN) .......................... 2012 2 0075742

(51) Int. Cl.

| | | |
|---|---|---|
| A47C 27/08 | (2006.01) | |
| B29D 22/02 | (2006.01) | |
| B32B 5/02 | (2006.01) | |
| B32B 27/12 | (2006.01) | |
| B29C 65/04 | (2006.01) | |
| B29C 65/18 | (2006.01) | |
| B29L 22/02 | (2006.01) | |
| B29L 31/00 | (2006.01) | |

(52) U.S. Cl.
CPC ............ *B29C 65/02* (2013.01); *B29C 66/439* (2013.01); *B29D 22/02* (2013.01); *B32B 5/022* (2013.01); *B32B 27/12* (2013.01); *B29C 65/04* (2013.01); *B29C 65/18* (2013.01); *B29C 66/1122* (2013.01); *B29C 66/433* (2013.01); *B29C 66/45* (2013.01); *B29C 66/47* (2013.01); *B29C 66/472* (2013.01); *B29C 66/4722* (2013.01); *B29C 66/53462* (2013.01); *B29C 66/69* (2013.01); *B29C 66/71* (2013.01); *B29C 66/7352* (2013.01); *B29C 66/83413* (2013.01); *B29C 66/8432* (2013.01); *B29C 66/919* (2013.01); *B29C 66/949* (2013.01); *B29L 2022/02* (2013.01); *B29L 2031/751* (2013.01); *B32B 2307/54* (2013.01); *B32B 2307/558* (2013.01); *B32B 2398/00* (2013.01); *B32B 2479/00* (2013.01)

(58) Field of Classification Search
USPC ......................................................... 156/145
See application file for complete search history.

(56) References Cited

U.S. PATENT DOCUMENTS

| | | | |
|---|---|---|---|
| 573,122 A | 12/1896 | Young | |
| 818,321 A | 4/1906 | Whall | |
| 1,331,018 A | 2/1920 | Luthy | |
| 1,851,768 A | 7/1930 | Hubbell | |
| 1,775,942 A | 9/1930 | Millmather | |
| 1,817,929 A * | 8/1931 | Pfeiffer | B29C 37/00 156/246 |
| 2,170,539 A | 6/1937 | Schoberg | |
| 2,383,592 A | 3/1944 | Davis | |
| 2,596,547 A | 5/1946 | Guest | |
| 2,549,597 A | 4/1951 | Davis et al. | |
| 2,691,179 A | 5/1951 | Kann | |
| 2,731,652 A | 6/1951 | Bishop | |
| 2,743,510 A | 5/1956 | Mauney et al. | |
| 2,753,573 A | 7/1956 | Barker | |
| 3,008,213 A | 11/1961 | Foster et al. | |
| 3,030,245 A | 4/1965 | Greiner et al. | |
| 3,459,615 A | 1/1966 | Eilerman | |
| 3,379,596 A | 4/1968 | Slutz | |
| 3,522,123 A | 7/1970 | Marchant | |
| 3,573,151 A | 3/1971 | Dawbarn | |
| 3,683,431 A | 8/1972 | Pennel et al. | |
| 3,899,622 A | 8/1975 | Geiger | |
| 4,272,856 A | 6/1981 | Wegener et al. | |
| 4,295,918 A | 10/1981 | Benson et al. | |
| 4,371,999 A | 2/1983 | Reid | |
| 4,417,639 A | 11/1983 | Wegener | |
| 4,483,030 A | 11/1984 | Flick et al. | |
| 4,488,929 A | 12/1984 | Ostertag | |
| 4,528,704 A | 7/1985 | Wegener et al. | |
| 4,535,490 A | 8/1985 | Wright | |
| 4,594,743 A | 6/1986 | Owen et al. | |
| 4,644,597 A | 2/1987 | Walker | |
| 4,682,378 A | 7/1987 | Savenije | |
| 4,773,104 A | 9/1988 | Wang | |
| 4,799,821 A | 1/1989 | Brodersen | |
| 4,843,659 A | 7/1989 | Popovich | |
| 4,920,588 A | 5/1990 | Watkins | |
| 5,083,361 A | 1/1992 | Rudy | |
| 5,101,823 A | 4/1992 | Smith | |
| 5,135,440 A | 8/1992 | Smollar et al. | |
| 5,249,323 A | 10/1993 | Kikuchi et al. | |
| 5,283,915 A | 2/1994 | Idland et al. | |
| 5,345,622 A | 9/1994 | Plone | |
| 5,490,295 A | 2/1996 | Boyd | |
| 5,543,194 A * | 8/1996 | Rudy | A43B 13/189 36/29 |
| D386,238 S | 11/1997 | Peterson | |
| 5,735,000 A | 4/1998 | Pfaeffle | |
| 5,865,564 A | 2/1999 | Muller et al. | |
| 5,924,144 A | 7/1999 | Peterson | |
| 5,985,071 A | 11/1999 | Wynne et al. | |
| 6,054,178 A | 4/2000 | Howells | |
| 6,209,150 B1 | 4/2001 | Hsu et al. | |
| 6,322,870 B1 | 11/2001 | Tsai | |
| 6,385,864 B1 | 5/2002 | Sell et al. | |
| 6,543,962 B2 | 4/2003 | Wells | |
| 6,571,405 B1 | 6/2003 | Saputo et al. | |
| 6,588,028 B1 | 7/2003 | Wu | |
| 7,032,258 B2 | 4/2006 | O'Hanlon | |
| 7,070,845 B2 | 7/2006 | Thomas et al. | |
| 7,254,853 B1 | 8/2007 | Kim | |
| 7,409,779 B2 | 8/2008 | Dojan et al. | |
| 7,467,496 B1 | 12/2008 | Cuisset et al. | |
| 7,591,036 B2 | 9/2009 | Lin et al. | |
| 7,694,372 B1 | 4/2010 | Boyd | |
| 7,987,531 B2 | 8/2011 | West | |
| 8,012,201 B2 | 9/2011 | Lashinski et al. | |
| 8,151,486 B2 | 4/2012 | Dua | |
| 8,241,451 B2 | 8/2012 | Rapaport et al. | |
| 8,479,412 B2 | 7/2013 | Peyton et al. | |
| 8,562,773 B2 | 10/2013 | Lin | |
| 8,789,294 B2 * | 7/2014 | Dojan | A43B 13/20 36/25 R |
| 8,813,389 B2 * | 8/2014 | Gishifu | A43B 13/20 36/28 |
| 9,156,203 B2 * | 10/2015 | Lin | A47C 27/087 |
| 9,254,240 B2 | 2/2016 | Lin et al. | |
| 2004/0040082 A1 | 3/2004 | Fireman et al. | |
| 2004/0040083 A1 | 3/2004 | Bentley | |
| 2005/0097777 A1 | 5/2005 | Goodwin | |
| 2006/0020332 A1 | 1/2006 | Lashinski et al. | |
| 2006/0025854 A1 | 2/2006 | Lashinski et al. | |
| 2006/0025855 A1 | 2/2006 | Lashinski et al. | |
| 2006/0137087 A1 | 6/2006 | Carreau et al. | |
| 2006/0252320 A1 | 11/2006 | Panse | |
| 2006/0292945 A1 | 12/2006 | Kuhn et al. | |
| 2007/0040368 A1 | 2/2007 | Manley et al. | |
| 2009/0049757 A1 | 2/2009 | Potter | |
| 2010/0107333 A1 | 5/2010 | Ortlieb | |
| 2012/0031265 A1 | 2/2012 | Song et al. | |
| 2013/0230671 A1 | 9/2013 | Lin et al. | |

FOREIGN PATENT DOCUMENTS

| | | |
|---|---|---|
| CN | 2064797 | 10/1990 |
| CN | 2074591 | 4/1991 |
| CN | 2287948 | 8/1998 |
| CN | 2361179 | 2/2000 |
| CN | 1280467 | 1/2001 |
| CN | 1124804 | 10/2003 |
| CN | 1506140 | 6/2004 |
| CN | 2659261 | 12/2004 |
| CN | 2676755 | 2/2005 |
| CN | 2706070 | 6/2005 |
| CN | 2776171 | 5/2006 |
| CN | 1867280 | 11/2006 |
| CN | 2908147 | 6/2007 |
| CN | 2930467 | 8/2007 |
| CN | 201032956 | 3/2008 |
| CN | 201169931 | 12/2008 |
| CN | 101628698 | 1/2010 |

(56) References Cited

FOREIGN PATENT DOCUMENTS

| | | |
|---|---|---|
| CN | 101817233 | 9/2010 |
| CN | 201790383 | 4/2011 |
| CN | 202051615 | 11/2011 |
| CN | 202151339 U | 2/2012 |
| CN | 203619151 | 6/2014 |
| DE | 203 17 936 | 3/2004 |
| DE | 202004000700 | 6/2004 |
| DE | 10 2006 05366 A1 | 5/2008 |
| EP | 0 152 536 | 8/1985 |
| EP | 0678263 | 10/1995 |
| GB | 313023 | 6/1929 |
| GB | 410502 | 11/1932 |
| GB | 1380153 | 1/1975 |
| JP | 60-55904 | 4/1985 |
| JP | 7327782 | 12/1995 |
| JP | 2006-527017 | 11/2006 |
| JP | 2007-506529 | 3/2007 |
| SU | 410502 | 5/1934 |
| WO | WO2004108047 | 12/2004 |
| WO | WO2005030005 | 4/2005 |

OTHER PUBLICATIONS

Intex Recreaction Corp., Easy Set Pool, packaging panel, Aug. 20, 2008, 1 page, USA.
Translation of Chinese Utility Model CN 202151339 U, Vertical Air Compartment, Feb. 29, 2012, 5 pages, China.
Third-Party Submission dated Jan. 5, 2014 in U.S. Appl. No. 14/444,337.
Examination Decision on the Request for Invalidation dated May 4, 2015 in Chinese Application No. 201320796506.9.
Search Report dated Feb. 3, 2015 in corresponding European Application No. 13167366.7.
Search Report dated Feb. 3, 2015 in corresponding European Application No. 13001948.2.
Search Report dated Feb. 3, 2015 in corresponding European Application No. 13001944.1.
International Search Report and Written Opinion dated Jan. 14, 2105 in PCT/US2014/017252.
Search Report dated Feb. 3, 2015 in corresponding European Application No. 13001947.4.
Search Report dated Feb. 3, 2015 in corresponding European Application No. 13001946.6.
Search Report dated Sep. 19, 2014 in corresponding European Application No. 12839169.5.
Search Report dated Nov. 8, 2013 in corresponding European Application No. 13167369.
Search Report dated Nov. 8, 2013 in corresponding European Application No. 13167364.
Search Report dated Nov. 7, 2013 in corresponding European Application No. 13001945.
Hydro-Solutions, Inc. WIPP System Product Specification; pp. 1-12, Waller, Texas; www.wippsystems.com, 2006.
International Search Report dated Mar. 11, 2015 in PCT International Application No. PCT/US14/68884.
Search Report dated Jan. 16, 2015 in GB 1421648.5.
Communication dated Dec. 23, 2015 in corresponding European Application No. 1300946.6.
Search Report dated Oct. 5, 2016 in corresponding European Application No. 13001948.2.
Post-Grant Review Petition for U.S. Pat. No. 9,254,240.
Declaration of Dr. Ali Sadegh.
Declaration of Patrizio Fumagalli dated Nov. 3, 2016.
"2009 Summer Inflatables", Appendix B of Fumagalli Declaration.
"2009 Above Ground Pools", Appendix A of Fumagalli Declaration.
P. V. Cavallaro et al., Air-Inflated Fabric Structures, Naval Undersea Wartare Center Division, Newport, Rhode Island (Nov. 5, 2006).
Chapter 20 from Roark's Formulas for Stress and Strain, 8th Edition, McGraw Hill 2012.
Excerpt from Oxford Dictionary of Mechanical Engineering, Oxford University Press, 2013.
Excerpt from Webster's New World Dictionary of the American Language, Prentice Hall Press (1986).
Bestway's Preliminary Invalidity Contentions for U.S. Patent No. 9,156,203, Exhibits L-V, dated Nov. 30, 2016, 497 pages.
Bestway's Preliminary Invalidity Contentions for U.S. Patent No. 8,562,773, Exhibits W-GG, dated Nov. 30, 2016, 34 pages.
IPR2017-01397—Petition for Inter Partes Review of U.S. Appl. No. 8,562,773, filed May 12, 2017, 83 pages.
IPR2017-01396—Petition for Inter Partes Review of U.S. Appl. No. 9,156,203, filed May 12, 2017, 91 Pages.
IPR2017-01397—Non-patent Exhibits to the Petition for Inter Partes Review of U.S. Appl. No. 8,562,773, 860 pages.
IPR2017-01396—Non-patent Exhibits to the Petition for Inter Partes Review of U.S. Appl. No. 9,156,203, 768 Pages.
Office Action dated Apr. 11, 2017 in corresponding U.S. Appl. No. 13/727,143, 8 pages.
Office Action dated Jul. 19, 2017 in corresponding U.S. Appl. 15/597,956.

\* cited by examiner

METHOD FOR PRODUCING AN INFLATABLE PRODUCT

RELATED APPLICATIONS

This application is a continuation of PCT Application Serial No. PCT/US2012/042079, filed Jun. 12, 2012, which claims priority to Chinese Patent Application Serial No. 201210053143.X, filed Mar. 2, 2012, Chinese Patent Application Serial No. 201210053146.3, filed Mar. 2, 2012, Chinese Patent Application Serial No. 201220075738.0, filed Mar. 2, 2012, and Chinese Patent Application Serial No. 201220075742.7, filed Mar. 2, 2012 and the disclosures of which are expressly incorporated by reference herein.

BACKGROUND

1. Technical Field

The present disclosure relates to an inflatable product structure, and in particular to an inflatable product structure which is light in weight and low in cost.

2. Description of the Related Art

Inflatable products, are light in weight, easy to house, and easy to carry. Such products technologies have been used for outdoor items and toys, as well as various household goods including inflatable beds, inflatable sofas and the like.

Many inflatable products utilize internal structures in order to form the product into its intended, predetermined shape upon inflation. For example, one type of inflatable bed, referred to as a wave-shaped, straight-strip or I-shaped inflatable bed, may include a tension-band type internal structure arranged along wave-shaped, straight-line or I-shaped pathways within the internal cavity. Another type of inflatable bed, referred to as a column-type inflatable bed, has tension bands arranged into honeycomb-shaped or cylindrical structures within the inflatable cavity.

These internal tension-band structures disposed in the cavity of the inflatable bed give shape to the bed as internal pressure increases, thereby preventing the inflatable bed from expanding evenly on all sides in the manner of a balloon. More particularly, in order to maintain an inflatable bed as a rectangular shape, the tension bands join the upper and lower surfaces of the inflatable bed to one another. To allow passage of pressurized air to both sides of these joining structures, the tension bands may be formed as belts stretching between the upper and lower surfaces, or as vertical expanses of material with air columns formed therein. The number and spacing of the tension bands is proportional to the sharpness of the rectangularity of the inflated product. That is to say, a greater number and/or linear extent of tension bands within the pressurized cavity results in a more "flat" bed surface.

In conventional inflatable products such as the inflatable beds described above, the tension bands are made of PVC sheets with a sufficient thickness to ensure spreading of force and concomitant reductions in stress in the product material. For example, the tension bands of known inflatable beds or sofas may have a thickness of about 0.36 mm. For some known water carrier devices, such as inflatable swimming pools, the internal tension bands may have a thickness of about 0.38 mm, while "sandwich" type inflatable swimming pools may have a thickness of 0.7-0.8 mm.

Thus, conventional inflatable structures utilizing belt- or sheet-like PVC tension bands meet the force requirements of the product by varying the thickness of the tension bands. However, where continuous plastic strips or belts are utilized, such tension bands contribute to increased weight of the inflatable product. Similarly, an increase in thickness and/or spatial density of solid-strip tension bands also increases the compressed/folded volume of the deflated inflatable structure.

SUMMARY

The present disclosure provides an internal tensioning structure for use in an inflatable product, and a method for producing the same. The tensioning structure fulfills the basic function of maintaining two adjacent inflatable surfaces in a desired geometric arrangement when the inflatable product is pressurized. The tensioning structure is formed by connecting a pair of plastic strips sheets via spaced-apart strands, such as strings or wires. When pulled taut, the strands provide a high tensile strength between the two opposed plastic strips. At the same time, the plastic strips facilitate a strong, long-lasting weld between the tensioning structure and the inflatable product.

Various configurations of the tensioning structure are contemplated within the scope of the present disclosure. In one embodiment, a pair of parallel plastic strips has a plurality of strands extending therebetween to connect the plastic strips to one another, with the strands substantially parallel to one another and substantially perpendicular to the plastic strips. In another embodiment, a similar arrangement of two parallel plastic strips are connected by a plurality of strands with each adjacent pair of such strands converging to a point at one of the plastic strips in a "V" configuration. Either embodiment may be incorporated into a tensioning structure with one of a number of geometric arrangements within the inflatable cavity, such as linear, cylindrical, wave-shaped, etc.

According to the present disclosure, a method for producing an inflatable product is provided. The method includes the steps of providing a first sheet made of weldable plastic, providing a second sheet made of weldable plastic, providing a plurality of weld strips made of weldable plastic, and providing a plurality of tensioning structures. Each tensioning structure includes at least one tensile sheet having a first side, a second side, and plurality of holes extending through the tensile sheet from the first side to the second side and a plurality of weld strips including a first weld strip positioned on one of the first and second sides of the tensile sheet, and a second strip positioned on one of the first and second sides of the tensile sheet. The method further includes the steps of welding the plurality of tensioning structures to the first sheet by welding the first weld strip to the first sheet, welding the plurality of tensioning structures to the second sheet by welding the second weld sheet to the second sheet, creating an inflatable chamber defined between the first and second sheets by the step of coupling the first sheet to the second sheet, and providing a valve in communication with the inflatable chamber to facilitate inflation and deflation of the inflatable product.

According to the present disclosure, a method for producing an inflatable product is provided. The method includes the steps of providing a first sheet made of weldable plastic, providing a second sheet made of weldable plastic, providing a plurality of weld strips made of weldable plastic, providing a non-woven sheet material having a first side and a second side, and assembling a plurality of tensioning structures by the steps of positioning a first of the plurality of weld strips on at least one of the first and second sides of the non-woven sheet material, and positioning a second of the plurality of weld strips on at least one of the first and second sides of the non-woven sheet material. The method further includes the steps of welding the plurality of tensioning structures to the first sheet by welding at least one of the first and second weld strips to the first sheet, welding the plurality of tensioning structures to the second sheet by welding at least one of the first and second weld strips to the second sheet, creating an inflatable chamber defined between the first and second sheets by the step of coupling the first sheet to the second sheet, and providing a valve in communication with the inflatable chamber to facilitate inflation and deflation of the inflatable product.

According to the present disclosure, a method for producing an inflatable product is provided. The method includes the steps of providing a first sheet made of weldable plastic, providing a second sheet made of weldable plastic, providing a plurality of weld strips made of weldable plastic, providing at least one tensile sheet, and assembling a plurality of tensioning structures after providing the at least one tensile sheet. The assembly step includes the steps of positioning a first of the plurality of weld strips on at least one of the first and second sides of the tensile sheet, and positioning a second of the plurality of weld strips on at least one of the first and second sides of the tensile sheet. The method further includes the steps of welding the plurality of tensioning structures to the first sheet by welding at least one of the first and second weld strips to the first sheet, welding the plurality of tensioning structures to the second sheet by welding at least one of the first and second weld strips to the second sheet, creating an inflatable chamber between the first and second sheets by the step of coupling the first and second sheets together, and providing a valve in communication with the inflatable chamber to facilitate inflation and deflation of the inflatable product.

According to the present disclosure, a method for producing an inflatable product is provided. The method includes the steps of providing a first sheet made of weldable plastic, providing a second sheet made of weldable plastic, providing a plurality of weld strip materials made of weldable plastic, providing a tensile sheet material having a first side, a second side, and plurality of holes extending through the tensile sheet material from the first side to the second side, and assembling a plurality of tensioning structures by the steps of positioning a first of the plurality of weld strip materials on at least one of the first and second sides of the tensile sheet material, positioning a second of the plurality of weld strip materials on at least one of the first and second sides of the tensile sheet material. The method further includes the steps of welding the plurality of tensioning structures to the first sheet by welding at least one of the first and second weld strip materials to the first sheet, welding the plurality of tensioning structures to the second sheet by welding at least one of the first and second weld strip materials to the second sheet, creating an inflatable chamber between the first and second sheets the step of coupling the first sheet to the second sheet, and providing a valve in communication with the inflatable chamber to facilitate inflation and deflation of the air mattress.

BRIEF DESCRIPTION OF THE DRAWINGS

The above mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the present invention, and such exemplifications are not to be construed as limiting the scope of the invention in any manner.

DETAILED DESCRIPTION

The present disclosure provides tensioning structures which give shape to inflatable devices, such as inflatable couches, beds or swimming pools. The tensioning structures are lightweight and occupy minimal volume when the device is deflated and packed away, while also functioning as a strong and durable internal support upon inflation and use of the inflatable device.

An exemplary tensioning structure in accordance with the present disclosure utilizes thin and flexible string- or wire-like strands which join two areas of fabric to one another. The strands are firmly connected to the adjacent fabric via an intermediate material, such as a strip or sheet, and the intermediate material is in turn firmly connected to the fabric. The area of contact between intermediate material and the attached strands may be manipulated to impart a connection strength commensurate with the tensile strength of the strand. Similarly, the area of contact between the intermediate material and the adjacent fabric may also be manipulated to impart a fabric/tensioning structure connection strength commensurate with the aggregate tensile strength of all strands in the tensioning structure.

Various tensioning structures and methods of manufacturing the same are described in detail below. It is contemplated that any of the present described tensioning structures may be used in any inflatable product, either alone, as a group or in combination with one another as required or desired for a particular design. In addition, it is contemplated that tensioning structures in accordance with the present disclosure can be used in other contexts, such as in camping equipment, or in any other context where a lightweight, packable structure is needed to join two pieces of material that are urged away from one another in use.

1. Weld Strips Joined by Spaced-Apart Strands.

Figure 1:
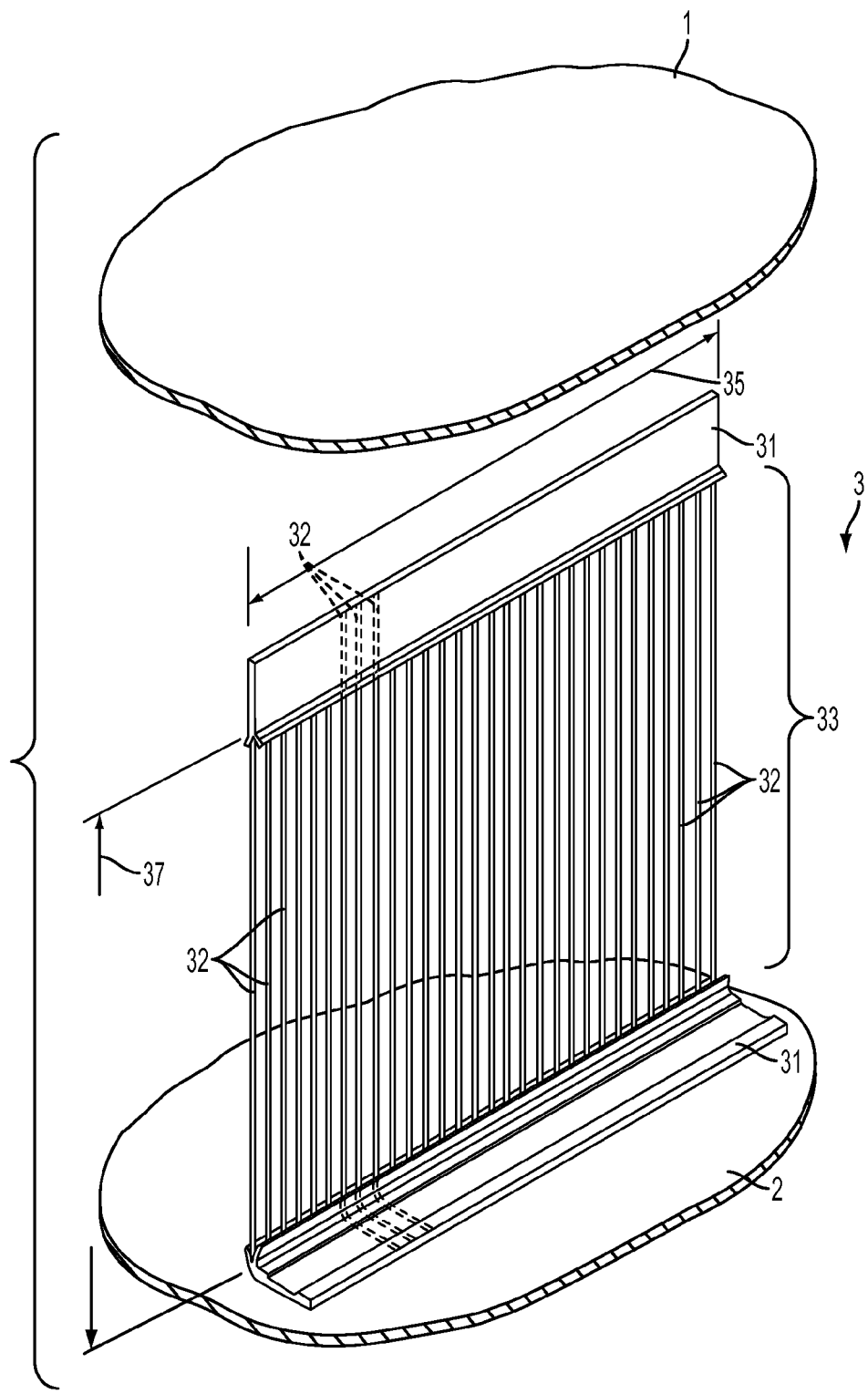
FIG. 1 is an exploded, perspective view of an inflatable structure incorporating a tensioning structure made in accordance with the present disclosure.
Figure 2:
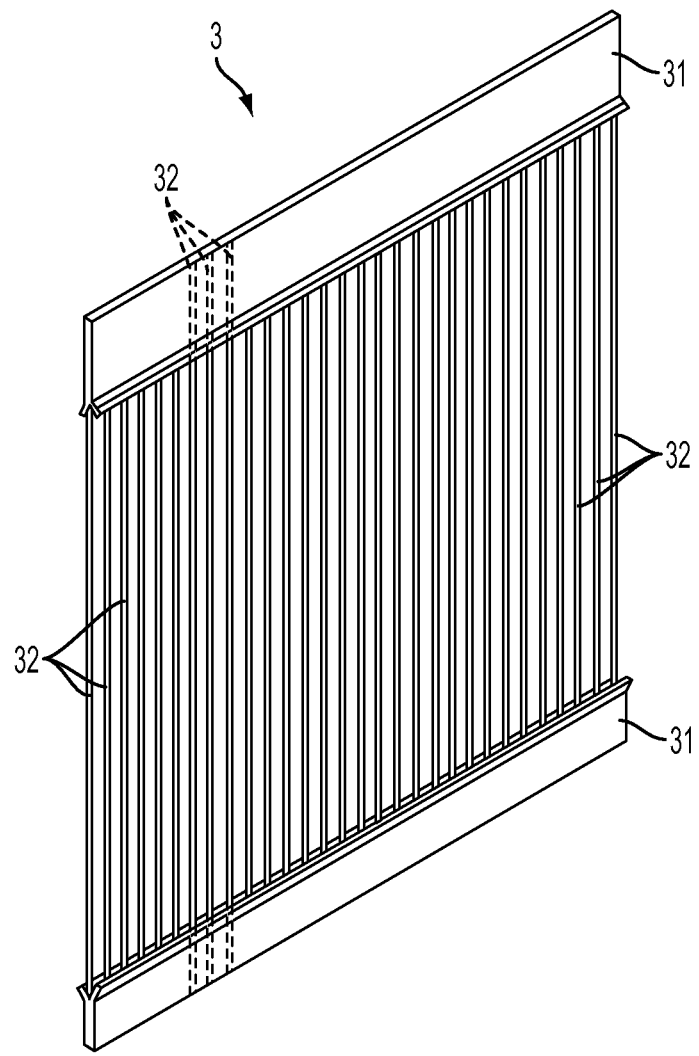
FIG. 2 is an enlarged perspective view of the tensioning structure shown in FIG. 1.

Turning now to FIGS. 1 and 2, tensioning structure 3 is shown joining upper material 1 to lower material 2. In the illustrated embodiment, tensioning structure 3 includes upper and lower weld strips 31 connected to one another by a plurality of substantially parallel strands 32 that define a gap portion extending between a gap between upper and lower sheets 1, 2. The upper and lower weld strips 31 are in turn welded to the upper material 1 and the lower material 2, respectively, such that forces urging upper and lower materials 1, 2 are encountered by tension in strands 32.

Optionally, reinforcing strands 5 (FIG. 3) may be provided along the longitudinal extent of weld strip 31 (i.e., substantially perpendicular to strands 32). Reinforcing strands 5, when provided, may be coupled to tensile strands 32, such as by folding strands 32 over reinforcing strands 5, tying strands 5, 32 to one another, or adhesively securing strands 5, 32 to one another. When so coupled, reinforcing strands 5 provide additional surface area contact with weld strips 31 and thereby improve the resistance of securing strands 5 to pulling free from weld strips 31. In addition, the presence of reinforcing strands 32 within weld strips 31 improves the tensile strength of weld strips 31 along their longitudinal extents.

The plurality of strands 32 in the tensioning structure 3 as shown in FIGS. 1 and 2 are arranged such that the strands 32 are substantially parallel to one another when strands 32 are pulled taut (i.e., when weld strips 31 are drawn away from one another). In addition, adjacent pairs of strands 32 may have even intervals therebetween, such that a substantially constant tensile strength of tensioning structure 3 is maintained across the longitudinal extent of weld strips 31. In an exemplary embodiment, strands 32 may extend along the entire width of weld strips 31, as illustrated in FIGS. 1 and 2, such that a large area of contact between strands 32 and weld strips 31 is achieved. For clarity, FIGS. 1 and 2 illustrate only a limited number of strands 32 affixed to strips 31 in this way, it being appreciated that all strands 32 in a tensioning structure 3 may be so affixed.

Together strands 32, with or without reinforcing strands 5, cooperate to define a tensile sheet/tensile sheet material that has a first side and a second side. When provided with reinforcing strands 5, strands 32 and reinforcing strands 5 cooperate to define holes that extend from the first side of the tensile sheet to the second side of the tensile sheet. Each hole is defined by a pair of adjacent strands 32 and the two reinforcing strands 5 positioned near the respective ends of strands 32. As such, each hole extends from one pair of weld strips 31 to the other pair of weld strips 31 with portions of the holes covered by respective pairs of weld strips 31. For each respective pair of weld strips 31, one weld strip 31 is positioned on the first side of the tensile sheet defined by strands 32 and the other weld strip 31 is positioned on the second side of the tensile sheet. During welding of weld strips 31, the tensile sheet defined by strands 32 is positioned between welds strips 31 of the respective pairs of weld strips 31. Strands 32 of the tensile sheet provide portions of the tensile sheet that extend perpendicular to longitudinal edges of weld strips 31. The tensile sheet has four sides. Two sides extend along the terminal ends of strands 32. The other two sides extend along the outermost strands 32 adjacent terminal ends of weld strips 31. Reinforcing strands 5 of the tensile sheet 5, when provided, provide portions of the tensile sheet that extend from one side of these sides to the opposite side of the four-sided sheet.

After welding and when reinforcing strands 5 are not provided, weld strips 31 of each respective pair of weld strips 31 are in contact between strands 32. The contact extends parallel to strands 32 between the longitudinal edges of the respective weld strips 31. When reinforcing strands 5 are provided, this contact between the longitudinal edges is interrupted by the reinforcing strands 5 of the tensile sheet. After welding of weld strips 31 to upper and lower sheets 1, 2, a majority of the tensile sheet is perpendicular to the four weld strips 31.

Figure 3:
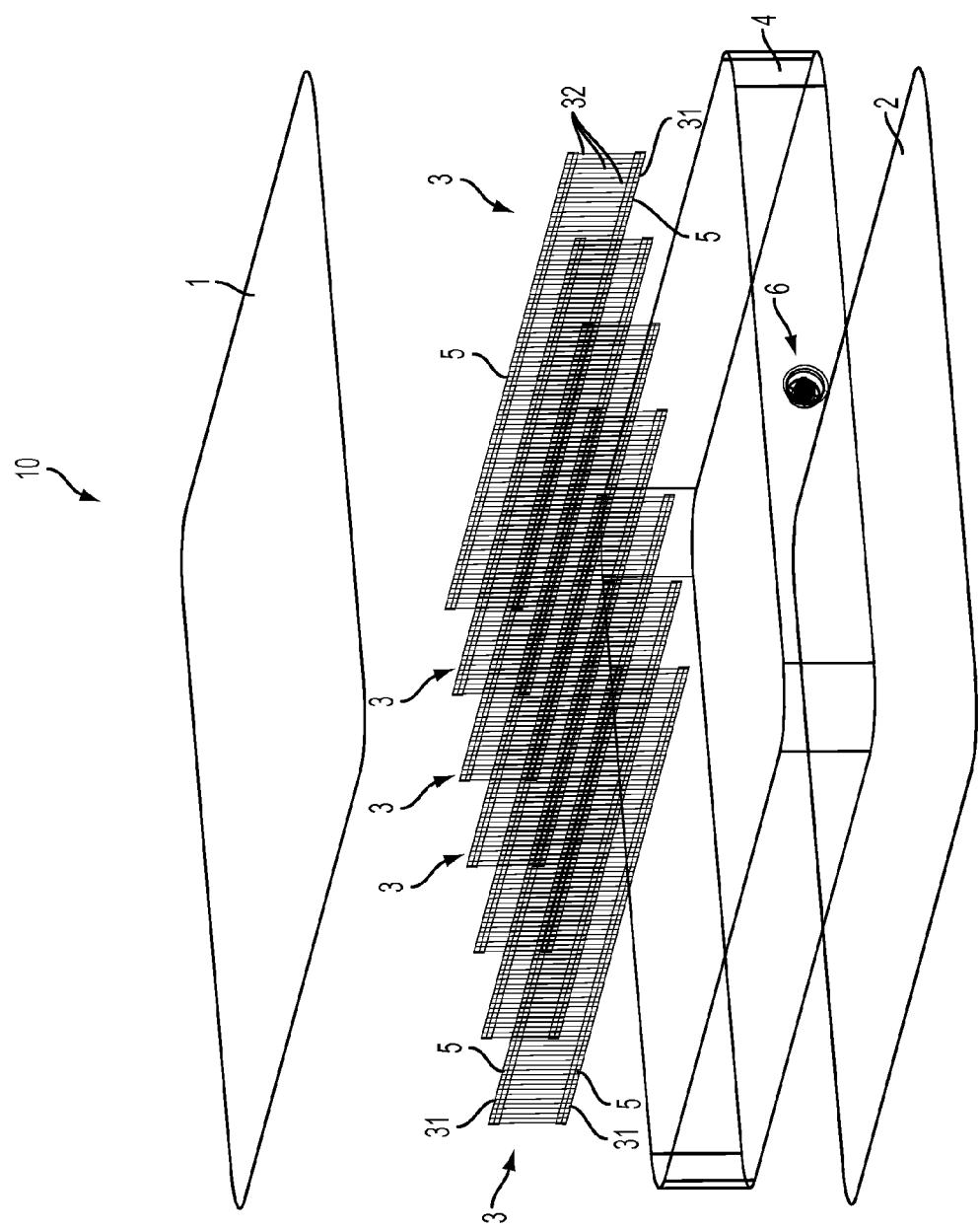
FIG. 3 is an exploded, perspective view of an inflatable bed incorporating tensioning structures made in accordance with the present disclosure.
Figure 4:
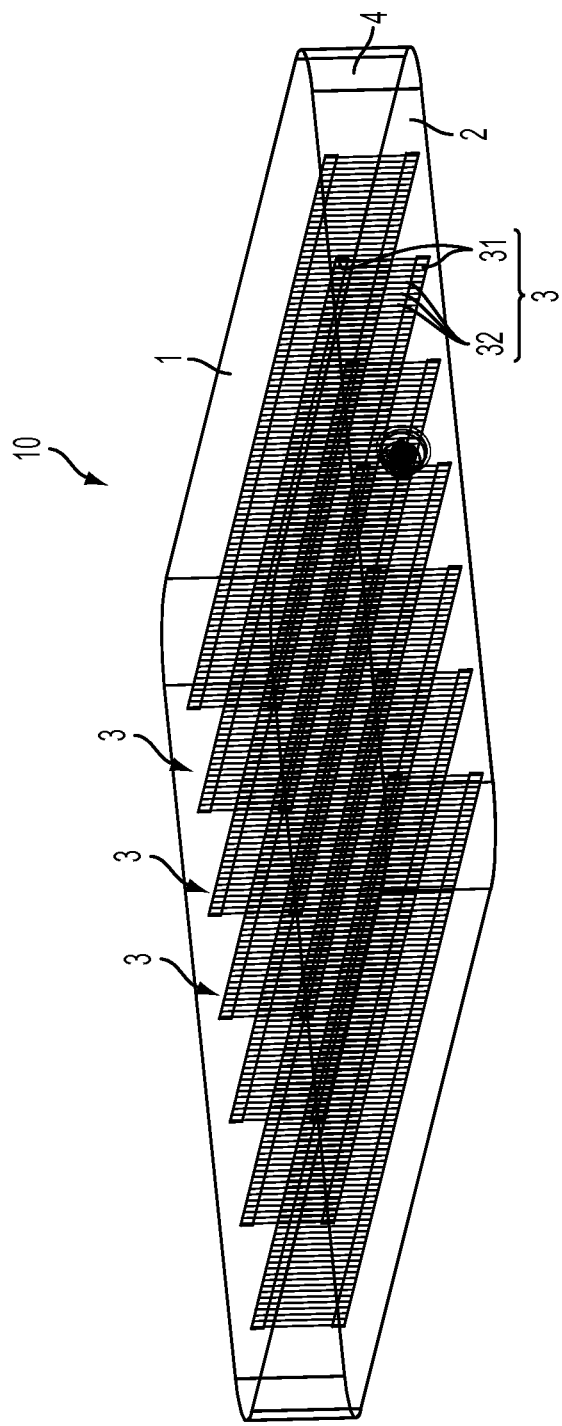
FIG. 4 is an assembled view of the inflatable bed of FIG. 3, in which the inflatable bed material is made transparent to show the internal arrangement of the tensioning structures.

In one exemplary application shown in FIGS. 3 and 4, a number of tensioning structures 3 are used in an inflatable structure such as air mattress 10, which includes a sleeping surface at upper material 1 and a ground-contacting surface at lower material 2. Annular side band or wall 4 is fixedly connected or welded to the peripheries of the upper material 1 and the lower material 2 to form an inflatable chamber. A valve 6 may be provided to facilitate inflation and deflation of the mattress 10.

Although mattress 10 is shown as a single layer, double layers may also be provided. Additional mattress features may also be provided such as those shown in U.S. Pat. No. 7,591,036 titled Air-Inflated Mattress, the entire disclosure of which is expressly incorporated by reference herein. In addition to mattresses, tensioning structure may be used in other inflatable products such as inflatable boats, inflatable islands, floatation devices, swimming pools, inflatable slides, and any other inflatable devices.

Each of the plurality of tensioning structures 3 is welded to respectively opposed portions of the inner surfaces of upper and lower materials 1, 2, as described in detail above. As shown in FIGS. 3 and 4, the tensioning structure 3 of the illustrated embodiment defines an overall longitudinal extent (that is, along the longitudinal direction of weld strips 31) corresponding to the width or length of the sleeping and ground-contacting materials 1, 2 of mattress 10.

As noted above, tensioning structures 3 are connected to upper and lower material 1, 2 by weld strips 31. Such welding is accomplished by abutting one of weld strips 31 to one of upper and lower materials 1, 2 and then applying heat to melt and fuse the material of weld strips 31 to the abutting material. In an exemplary embodiment, weld strips 31 and upper and lower material 1, 2 are both made of PVC, and the welding process is accomplished by applying 105 degree Celsius heat for approximately 0.5 seconds. Upper and lower sheets 1, 2 and weld strips 31 have thicknesses ranging from 0.15 to 1.0 millimeters with 0.34 millimeters being preferred for upper and lower sheets 1, 2 and 0.18 millimeters being preferred for weld strips 31. Weld strips 31 are preferably 12.7 millimeters wide and may range from 1 to 100 millimeters wide. The PVC used preferably has a tensile strength ranging from at least 7 kgf/cm to 73 kgf/cm and a density ranging from 0.8-2.5 grams per centimeter cubed with a preferred density of 1.5 grams per centimeter cubed.

Figure 5:
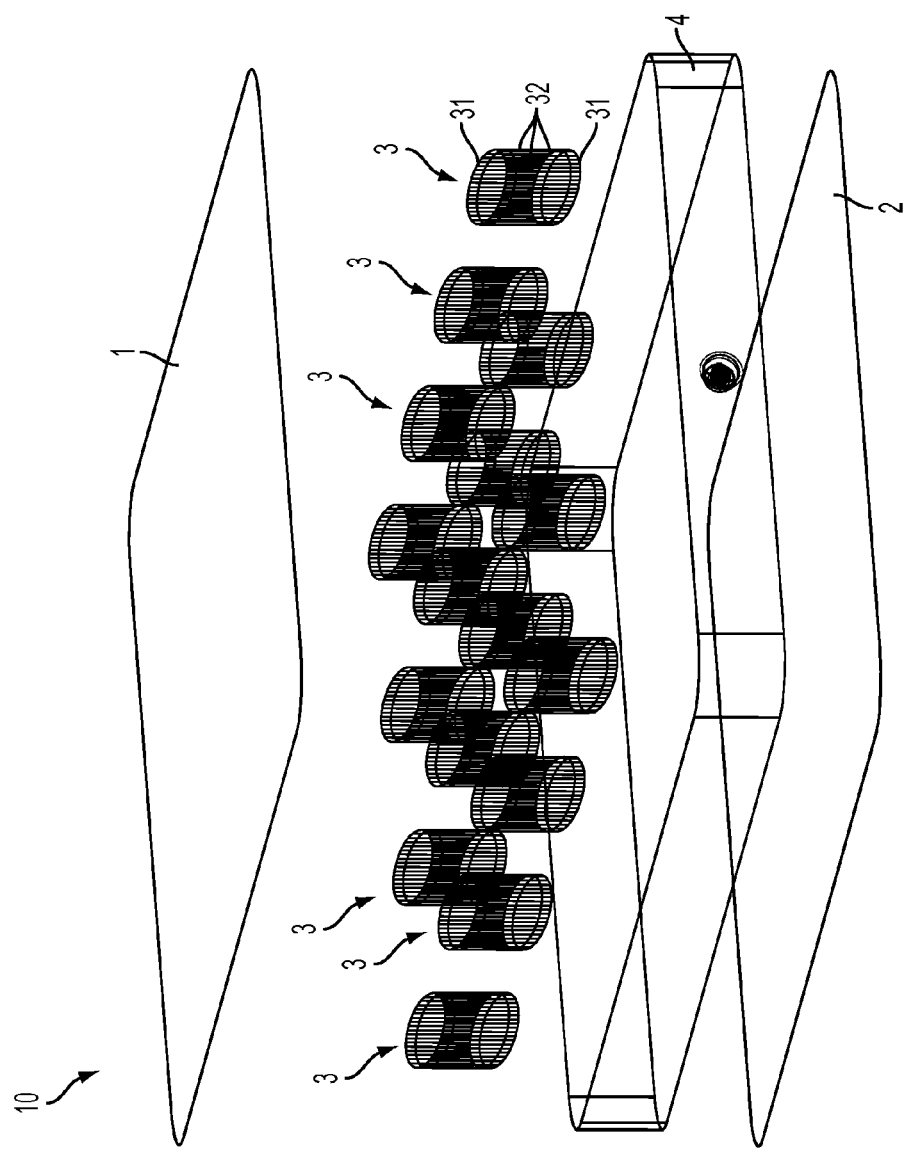
FIG. 5 is an exploded, perspective view of an inflatable bed incorporating an alternative geometric arrangement of tensioning structures made in accordance with the present disclosure.
Figure 6:
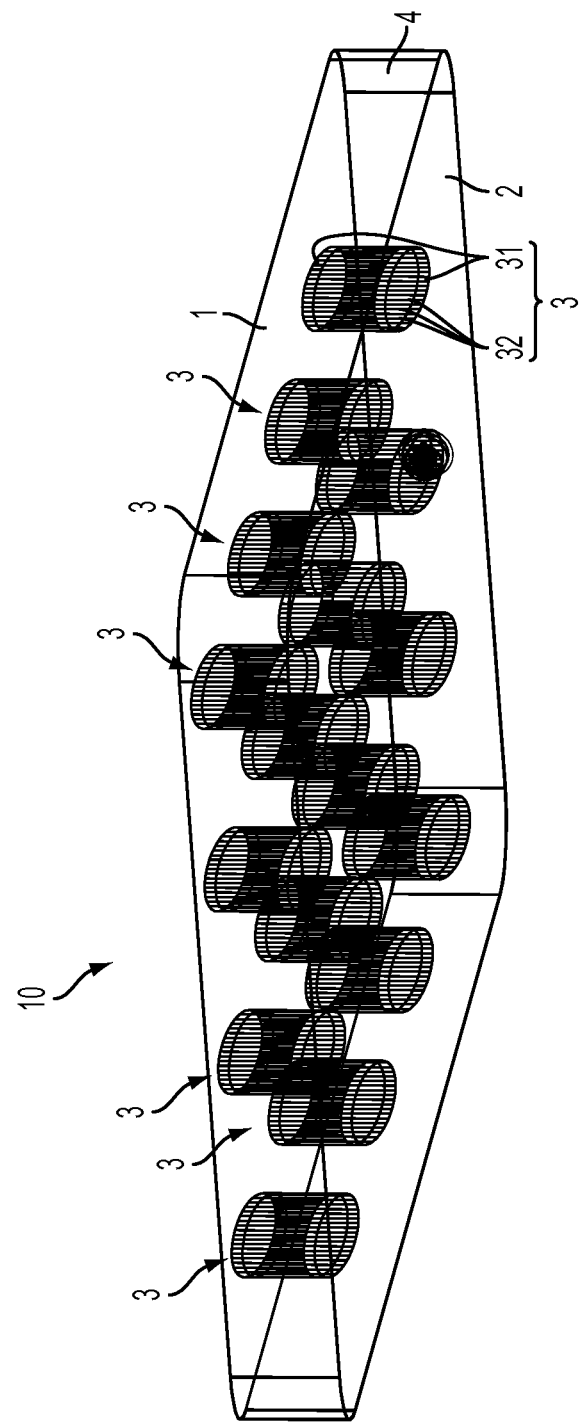
FIG. 6 is an assembled view of the inflatable bed of FIG. 5, in which the inflatable bed material is made transparent to show the internal spatial arrangement of the tensioning structures.

In FIGS. 3 and 4, tensioning structures 3 are welded to upper and lower material 1, 2 along a substantially linear path, with the plurality of structures 3 substantially parallel to one another and equally spaced across materials 1, 2. However, it is contemplated that the welding geometry may take any other suitable geometry, such as a wave-like path, I-shaped path, Z-shaped path or V-shaped path. One exemplary alternative geometry is a cylindrical or columnar arrangement, as illustrated in FIGS. 5 and 6. In this arrangement, upper and lower weld strips 31 are each connected at their ends in an end-to-end manner to form an arcuate ring, such as a circular ring as illustrated. The plurality of strands 32 between the upper and lower weld strips 31 thus form a closed columnar periphery, thereby forming the body of a column. Upon assembly of inflatable bed 10, this column is welded to upper and lower materials 1, 2 in a similar fashion as described herein with respect to linearly arranged tensioning structure 3.

When mattress 10 is inflated, the introduction of pressurized air into the cavity of mattress urges upper and lower materials 1, 2 apart from one another. When sufficiently pressurized, strands 32 become taut and tensioning structures 3 prevent any further spreading apart of upper and lower materials 1, 2 in the vicinity of each tensioning structure 3. Further pressurization causes further tensile stress within tensioning structures 3, and additional forces on the weld between tensioning structures 3 and the adjacent material.

In an exemplary embodiment of mattress 10, tensioning structure 3 includes as few as one strand every two centimeters, 1, 2, 3, 4, strands per centimeter of longitudinal extent of weld strips 31, or as much as 5, 10, 15, 20, 30, 40, 50, or more strands per centimeter, or may have any number of strands per centimeter within any range defined by any of the foregoing values. According to the preferred embodiment, there is about 2.8 millimeters between strands (i.e., 3.6 strands per centimeter). Strands 32 may be made of regular cotton, polyester, nylon thread made of multiple filaments twisted together, of the type typically used in clothing seams, or any other strand types. These regular threads provide substantial tensile strength at a very low cost. According to alternative embodiments, strands 32 may be woven together to form a fabric. According to another embodiment, non-woven fabric may be used to form the portion of tensioning structure 3 extending through the gap between sheets 1, 2.

According to the present disclosure, the threads may range from diameters of 0.1 to 1.0 millimeters. According to the preferred embodiment, the thread has a diameter of 0.2 millimeters. According to the present disclosure, the tensile strength of the threads may range from 0.2 kgf to 10 kgf per thread. According to the preferred embodiment, the tensile strength of the thread is 3 kgf per thread. According to the preferred embodiment, the threads have a density range from 0.01 to 0.3 grams per meter. According the preferred embodiment, the threads are 0.085 grams per meter. Of course, it is appreciated that other materials could be used, such as monofilament lines, metal wires or cables, plastic and the like.

The above-described exemplary arrangement of tensioning structure 3 yields a strong finished product suitable for use in a wide variety of inflatable products. In exemplary embodiments, tensioning structure 3 has strands 32 with an overall axial span between 5 centimeters and 65 centimeters, rendering strands 32 suitable to span a correspondingly sized gap formed between the spaced-apart weld strips 31. Therefore, this exemplary embodiment is suitable for use in mattress 10 having an inflated thickness approximately equal to the axial span of strands 32. This exemplary embodiment further uses the regular thread material noted above with a strand density in the ranges given above. The resulting exemplary tensioning structure 3 has an overall tensile strength between 5.9 and 23.3 kgf per linear centimeter (where linear centimeters are measured along the longitudinal extent of weld strips 31).

When mattress 10 is inflated, tensioning structure defines an operable area along its longitudinal extent and across the gap between upper and lower materials 1, 2. More particularly, the area occupied by tensioning structure 3 is defined as the total area of the gap between the material sheets joined by tensioning structure 3, with such gap measured along the longitudinal extent of the tensioning structure such that the measured area is inclusive of each of the plurality of strands 32. Where tensioning structure 3 is linearly arranged and upper and lower materials 1, 2 are parallel to one another (as shown, for example, in FIGS. 3 and 4), this area is simply the longitudinal extent of tensioning structure 3 multiplied by the space between upper and lower materials 1 and 2. Where tensioning structure 3 takes a non-linear path (such as the columnar, arcuate path shown in FIGS. 5 and 6, for example), or upper and lower materials 1 and 2 are non-parallel, the above-described method for measuring area still results in an accurate operable area.

The above-described exemplary arrangement of tensioning structure 3 achieves high tensile strength while promoting light weight and low packed volume of the finished inflatable product. According to the present disclosure, strands 32 and the area between strands 32 define a gap portion 33 (see FIG. 1) of tensioning structure 3 spanning the gap between upper and lower materials/sheets 1, 2 that maintains a spatial relationship between the first and second sheets when mattress 10 is inflated. As shown in FIG. 1, the collection of strands 32 that define this gap portion 33 having an extent 35 measured along the surface of at least one of first sheet 1 and second sheet 2. Strands 32 of this gap portion 33 of tension structure 3 collectively occupy a volume. Gap portion 33 has an operable area defined by extent 35 of gap portion 33 (also closely approximate to a length of weld strips 31) and length 37 of strands 32. The operable area is occupied by strands 32 of tensioning structure 3 and defines a total area of the gap between first sheet 1 and second sheet 2, as measured along extent 35 of gap portion 33 of tensioning structure 3. For example, if strands 32 of an example tension structure have a length 37 of 100 millimeters between first and second sheets 1, 2 and extent 35 of gap portion 33 is 100 millimeters, the operable area of gap portion 33 defined by strands 32 is 10,000 square millimeters. Assuming that there are 3.6 strands per centimeter, there will be 3,571 millimeters of strands 32 within the 10,000 square millimeter operable area. If strands 32 have a diameter of 0.2 millimeters, the total volume occupied by strands 32 will be 112.2 millimeters cubed. In this example, gap portion 33 of tensioning structure 3 defines an operable area-to-volume ratio of 89.13 millimeters squared per millimeters cubed (ex. 10,000 millimeter squared/112.2 millimeters cubed). According to the present disclosure, the operable area-to-volume ratio may range from 10 to 3,000 millimeters squared per millimeter cubed.

Because of use of strands 32 rather than PVC sheets, the overall weight of mattress 10 can also be reduced. Gap portion 33 of tensioning structure 3 defined by strands 32 has a total weight and operable area, as discussed above. In the above example, the operable area was 10,000 square millimeters (100 millimeters by 100 millimeters) and there were 3.6 strands per centimeter. This results in 3,571 millimeters of thread. At a density of 0.085 grams per meter of thread, the total thread will weigh 0.304 grams. As a result, an operable area-to-weight ratio will be about 32,941 square millimeters per gram (or 329,412 square centimeters per kilogram) in the preferred embodiment (ex. 10,000 square millimeters/0.304 grams). According to some embodiments of the present disclosure, the operable area-to-weight ratio is between 8,000 and 5,000,000 square centimeters per kilogram. According to other embodiments, the operable area-to-weight ratio is between 12,500 and 2,500,000 square centimeters per kilogram. According to other embodiments, the operable area-to-weight ratio is between 20,000 and 1,000,000 square centimeters per kilogram.

Because of use of strands 32 rather than PVC sheets, the average thickness of gap portion 33 of tensioning structure 3 extending between first and second sheets 1, 2 can also be reduced. Gap portion 33 of tensioning structure 3 defined by strands 32 has an average thickness and operable area, as discussed above. The average thickness is reduced by the nominally circular cross section of strands 32 and the gaps between each strand 32.

For example, the maximum thickness of gap portion 33 is the diameter of strands 32 (0.2 millimeters in the above example). The minimum thickness of gap portion 33 is zero in unoccupied areas between strands 32. When averaged over the total area of gap portion 33 occupied by strands 32 and the total area of gap portion 33 without strands 33, the average thickness is less than the diameter of strands 32. Furthermore, if the distance between strands 32 is increased, the average thickness decreases because more of gap portion 33 is unoccupied by strands (i.e., the amount of gap portion 33 with zero thickness increases, which decreases the average thickness of gap portion 33).

In the above example, the operable area was 10,000 square millimeters (100 millimeters by 100 millimeters) and there were 3.6 strands per centimeter (or 2.8 millimeter from strand 32 to strand 32). In contrast to the maximum thickness of a circular thread, which is the diameter, the average thickness of a circular thread is pi*diameter/4. Using strands 32 with a diameter of 0.2 millimeters, results in average thickness of 0.157 millimeters for each strand 32. Because of the gaps between strands 32, the average thickness of gap portion 33 defined by strands 32 and the gaps therebetween is 0.0112 millimeters (i.e. 2.8 millimeters between strands 32 has a thickness of zero, which reduces the average thickness of gap portion 33 to much less than the average thickness of strands 32). According to some embodiments of the present disclosure, the average thickness of the gap portion of tensioning structure 3 is between 0.0003 to 0.1 millimeters. According to other embodiments, the average thickness is between 0.001 and 0.05 millimeters. According to other embodiments, the average thickness is between 0.005 and 0.02 millimeters.

Figure 7:
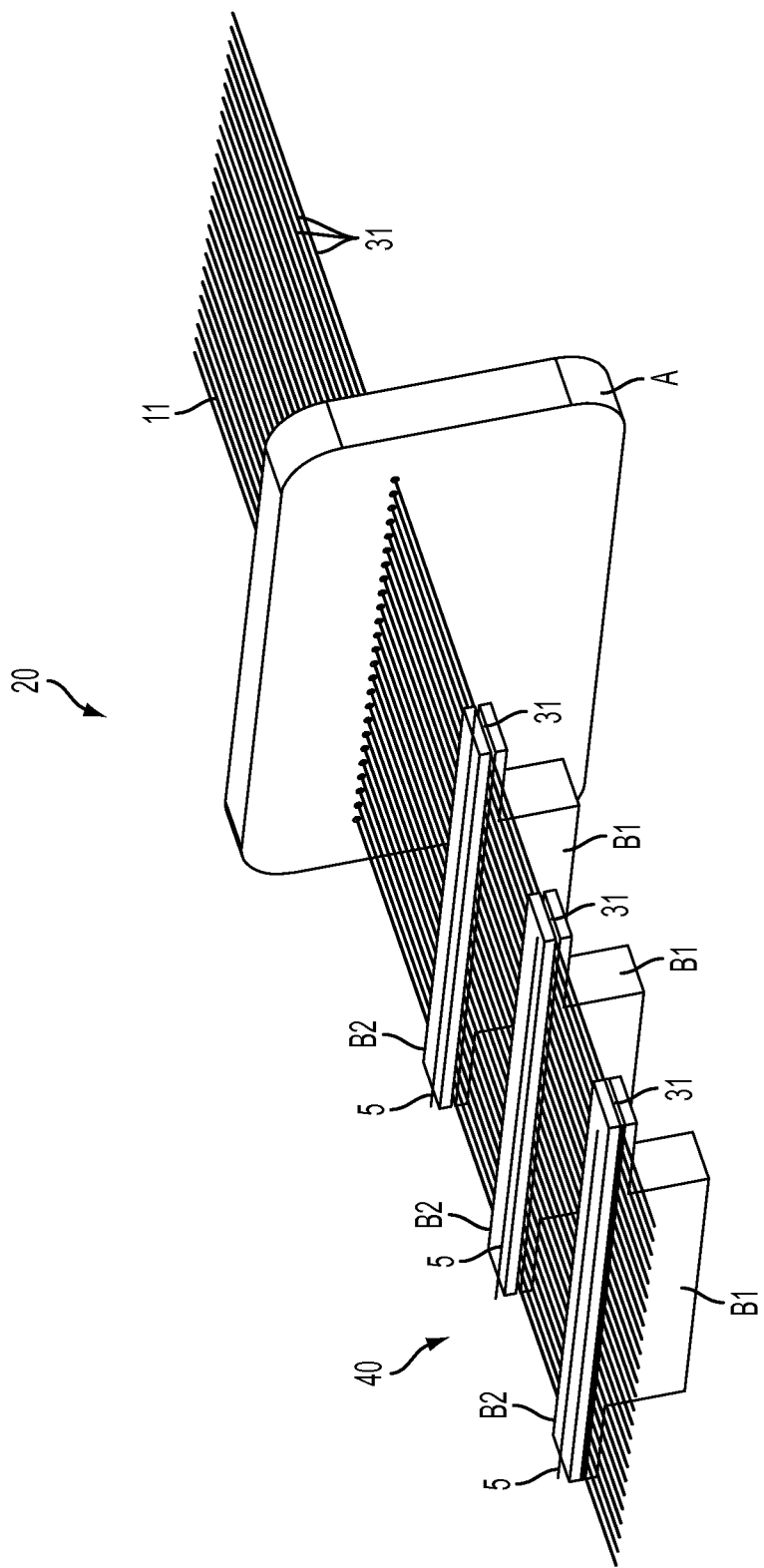
FIG. 7 is a perspective view of an apparatus for producing bulk material for the tensioning structures shown in FIGS. 3-6.

Turning now to FIG. 7, an apparatus 20 suitable for manufacturing tensioning structure 3 is shown. To operate apparatus 20 to this end, a plurality of strands 32 are provided from a bulk thread supply 11, which may be a yarn stand containing several spools of yarn for example. Thread supply 11 continuously delivers the plurality of strands 32 via strand guide A, which includes a plurality of apertures through which individual strands 32 pass after delivery from thread supply 11 and before incorporation into bulk tensioning structure material 30 (shown in FIG. 9 and described below). Strand guide A maintains uniform spacing of strands 32 from one another, and arranges strands 32 parallel to one another such that the plurality of strands 32 are substantially planar. The width of weld strips 31, the distance between neighboring pairs of weld strips 31, and the spacing between neighboring pairs of strands 32 can be set to any values as required or desired by an intended use, such as in a particular inflatable product.

These planar, parallel and even spaced strands 32 are then passed in to welder 40, as shown in FIG. 7. As shown in FIG. 7, when reinforcing strands 5 are placed on parallel strands 32, they cooperate to define a non-woven tensile sheet including parallel strands 32 that are perpendicular to reinforcing strands 5 positioned on one side of parallel strands 32. Weld strips 31 are positioned substantially parallel to the tensile sheet defined by strands 32 and reinforcing stands 5. As shown, welds strips 31 positioned above the tensile sheet defined by strands 32 are coplanar and weld strips 31 positioned below the tensile sheet are coplanar.

Welder 40 may be a thermofusion device, using heat to join two plastic materials together, or may be a high-frequency welder, in which electromagnetic waves take advantage of excitable chemical dipoles in the plastic material to soften and join the materials to one another. Moreover, any suitable welding method may be employed by welder 40, as required or desired for a particular material and process. Another alternative is to forego a welding process and use adhesive to join strands 32 to weld strips 31. Where adhesive connection is utilized, welder 40 may be replaced by a similarly arranged adhesive device, such as a gluing device. Yet another alternative is to utilize a sewing machine to mechanically join weld strips 31 to strands 32. Moreover, weld strips 31 need not be welded to upper or lower materials 1, 2, and the term "weld strip" as used herein refers to any strip of material suitable for affixation to another material, whether by application of heat, application of adhesive, mechanical joining methods such as sewing and riveting, or any other suitable method.

Weld strips 31, having a length corresponding to the width of the arranged plurality of strands 32, are positioned on lower dies B1 of welder 40. Strands 32 that define the tensile sheet are advanced over weld strips 31 as illustrated, and upper dies B2 are then lowered into contact with weld strips 31. Energy (i.e., heat or electromagnetic waves) is applied to fixedly connect the weld strip 31 with each of the plurality of strands 32 such that the respective strands 32 are fixed in the spaced apart and parallel configuration dictated by strand guide A. When so fixed, bulk material 30 (FIG. 9) is complete and ready for use.

The finished bulk material 30 may then be delivered to a take-up device (not shown), such as a spool or roll. This allows bulk material 30 to be continuously produced and stored for later use. Bulk material 30 can be converted into tensioning structure 3 (FIG. 2) by cutting down the center of weld strip 31. As a result of being cut, the tensile sheet/ tensile sheet material divided into a plurality of smaller tensile sheets. Similarly, weld strips/weld strip material 31 is divided into a pair of weld strips 31, with each resulting weld strips 31 having half the width of a weld strip/weld strip material 31 prior to being cut. Tensioning structure 3 can then be applied to various inflatable products by trimming the length and width thereof according to the dimensions of the product.

As noted above, reinforcement strand 5 may be added to tensioning structure 3 to further improve the strength thereof, including the tensile strength of weld strips 31. To add at least one reinforcement strand 5 to bulk material 30, reinforcement strands 5 are arranged perpendicular to the plurality of strands 32, and abutting the respective weld strips 31. Upper die B2 of welder 40 is pressed down to fixedly connect the weld strips 31 to both reinforcement strands 5 and the plurality of strands 32, as described above. Reinforcement strands 5 are illustrated in FIG. 3 but omitted from FIG. 4 for clarity.

As shown in FIG. 4, tensioning structures 30 are positioned within band 4 and welded to upper and lower sheet 1, 2. Although shown as perpendicular to sheets 1, 2 in FIG. 4, after welding, weld strips 31 lay flat on sheets 1, 2 after welding as shown in the lower portion of FIG. 1. Similarly, in mattresses 10 of FIGS. 6, 21, 23, and 28, weld strips 31 are shown perpendicular to sheets 1, 2, but will lay flat on sheets 1, 2 upon welding as shown in the lower portion of FIG. 1.

Figure 8:
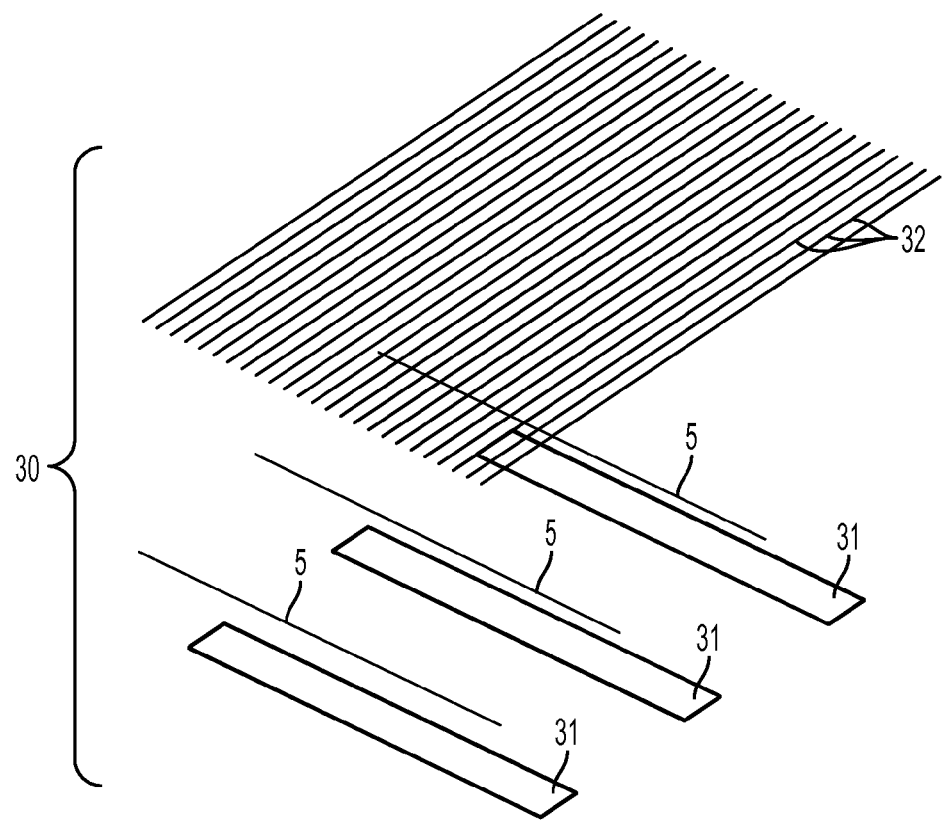
FIG. 8 is an exploded, perspective view showing a first embodiment of the bulk material created by the apparatus of FIG. 7.
Figure 9:
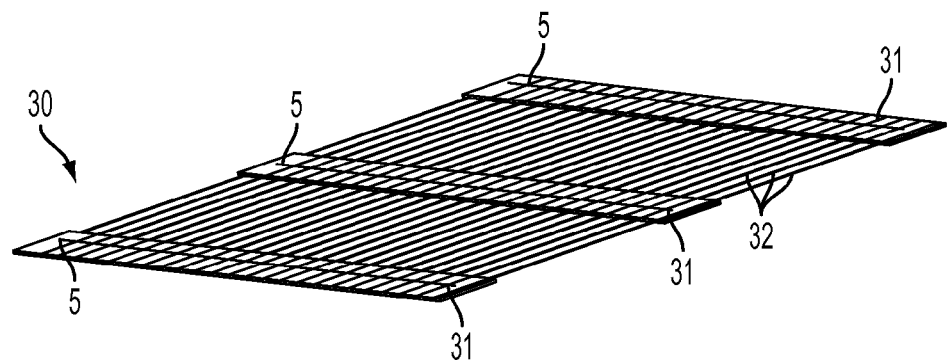
FIG. 9 is a perspective view showing a first embodiment of the bulk material created by the apparatus of FIG. 7.
Figure 10:
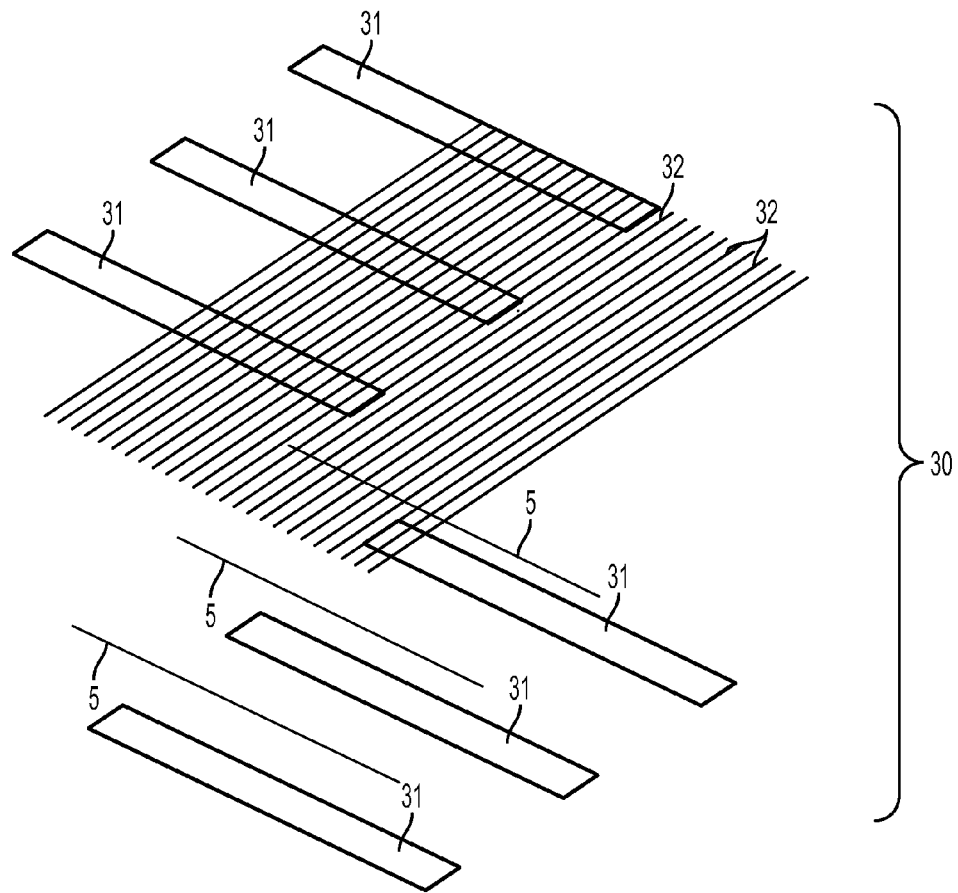
FIG. 10 is a perspective view showing a second embodiment of the bulk material created by the apparatus of FIG. 7.
Figure 11:
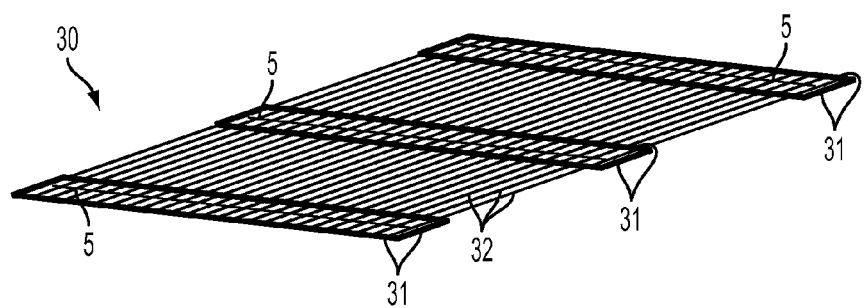
FIG. 11 is a perspective view showing a second embodiment of the bulk material created by the apparatus of FIG. 7.

As illustrated in FIGS. 8 and 9, bulk material 30 (FIG. 9) may be formed using a single layer of weld strips 31 connecting to strands 32. In another exemplary embodiment shown in FIGS. 10 and 11, bulk material 30 may be manufactured as a dual layer structure using a pair of weld strips both above and below strands 32. The use of two mutually opposed weld strips employs a gripping action to "trap" or capture the strands 32 therebetween, thereby contributing to a high-strength coupling interface. When implemented in an inflatable product, the resulting dual-layer tensioning structure 3 has improved strength and can be welded to upper or lower material 1, 2 (FIGS. 1, 3 and 4) on either side. As shown in FIGS. 10 and 11 and discussed above, at least one reinforcement strand 5 may also be captured between the weld strips 31.

2. Sheet-Backed Tensioning Structures with Affixed Strands.

Figure 12:
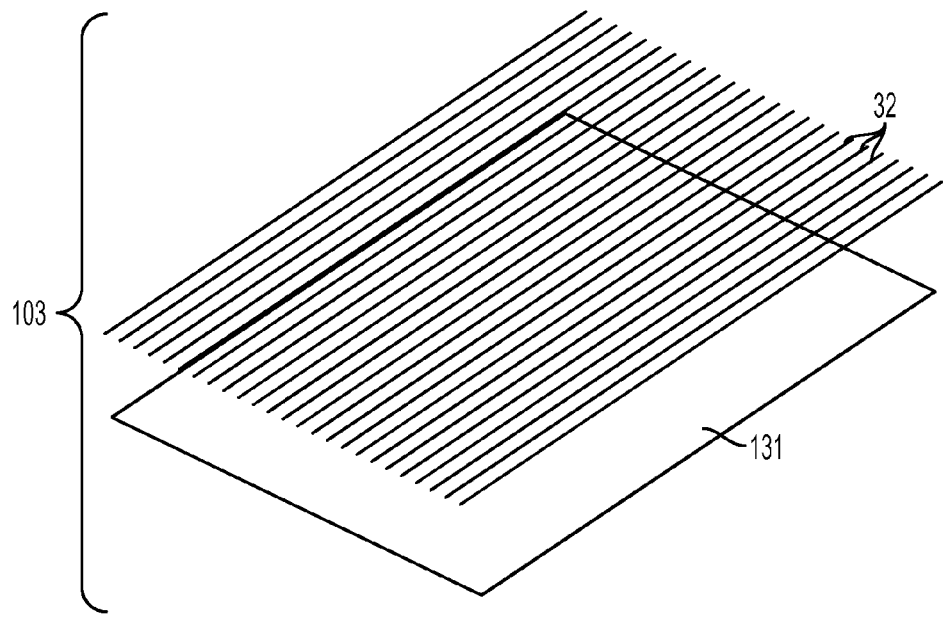
FIG. 12 is an exploded, perspective view of a first alternative tensioning structure made in accordance with the present disclosure.
Figure 13:
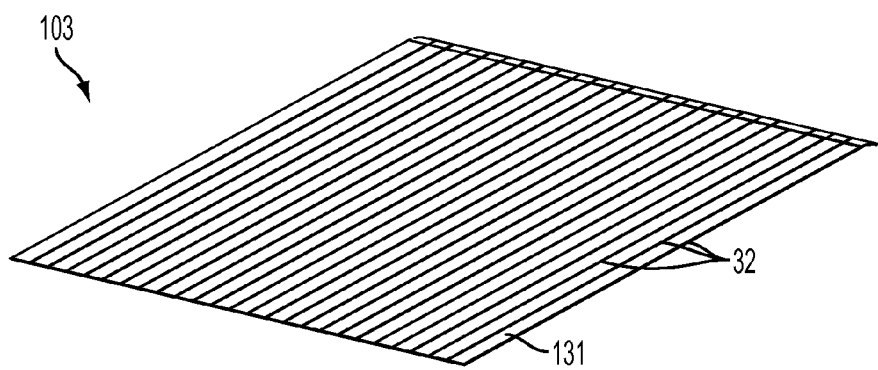
FIG. 13 is an assembled, perspective view of the first alternative tensioning structure shown in FIG. 12.

An alternatively arranged tensioning structure is shown in FIGS. 12 and 13 as tensioning structure 103. Structure 103 is substantially similar to tensioning structure 3 described above, with reference numerals of structure 103 analogous to the reference numerals used in structure 3, except with 100 added thereto. Elements of structure 103 correspond to similar elements denoted by corresponding reference numerals of structure 3, except as otherwise noted.

Tensioning structure 103 includes a plurality of strands 32 which are evenly spaced and arranged substantially parallel to one another, in a similar fashion to tensioning structure 3 described above. However, tensioning structure 103 includes weld sheet 131 in place of weld strips 31 of structure 3. Rather than affixing the ends of strands 32 to weld strips 31, the entire length of strands 32 are affixed to weld sheet 131. Weld sheet 131 serves to provide for proper positioning and protection of the plurality of strands 32, such as to avoid knotting or damage of strands 32 during practical use. However, because tensioning structure 103 includes strands 32 embedded therein, weld sheet 131 does not need to bear significant tensile loads and can be kept to a minimal thickness. For example, weld sheet 131 may be 0.10 millimeters in thickness.

Figure 14:
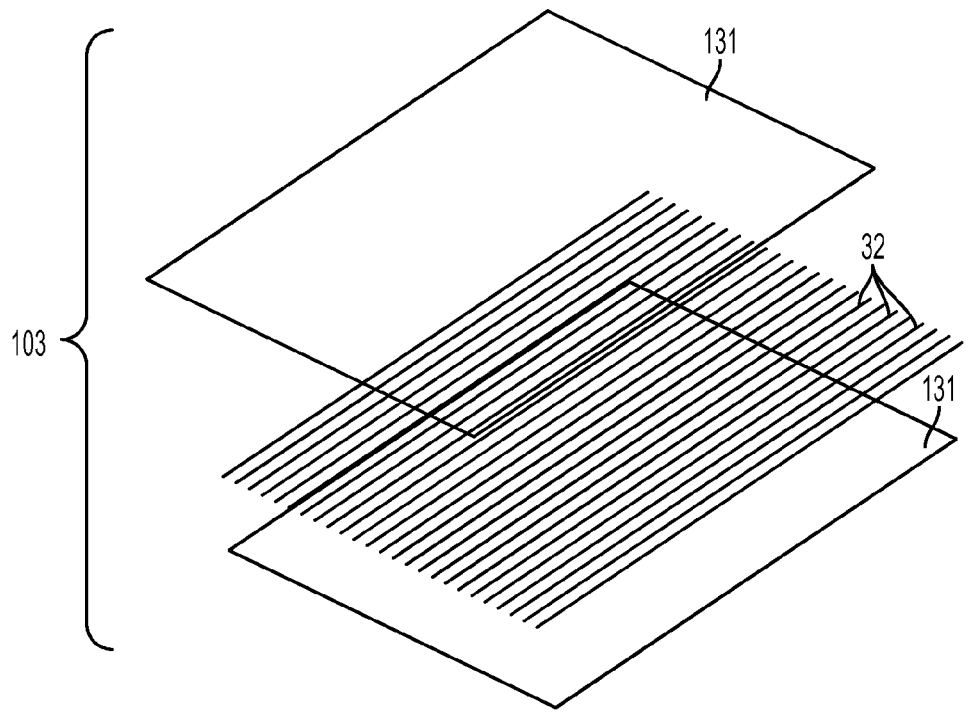
FIG. 14 is an exploded, perspective view of a second alternative tensioning structure made in accordance with the present disclosure.

In FIGS. 12 and 13, a single weld sheet 131 is used, though other arrangements are contemplated. FIG. 14, for example, illustrates tensioning structure 103 (FIG. 13) with an extra weld sheet 131 applied opposite the first weld sheet 131. Similar to the embodiment of tensioning structure 3 using mutually opposed weld strips 31 (FIGS. 10 and 11), the mutually opposed weld sheets 131 may be used to encapsulate strands 32.

Figure 15:
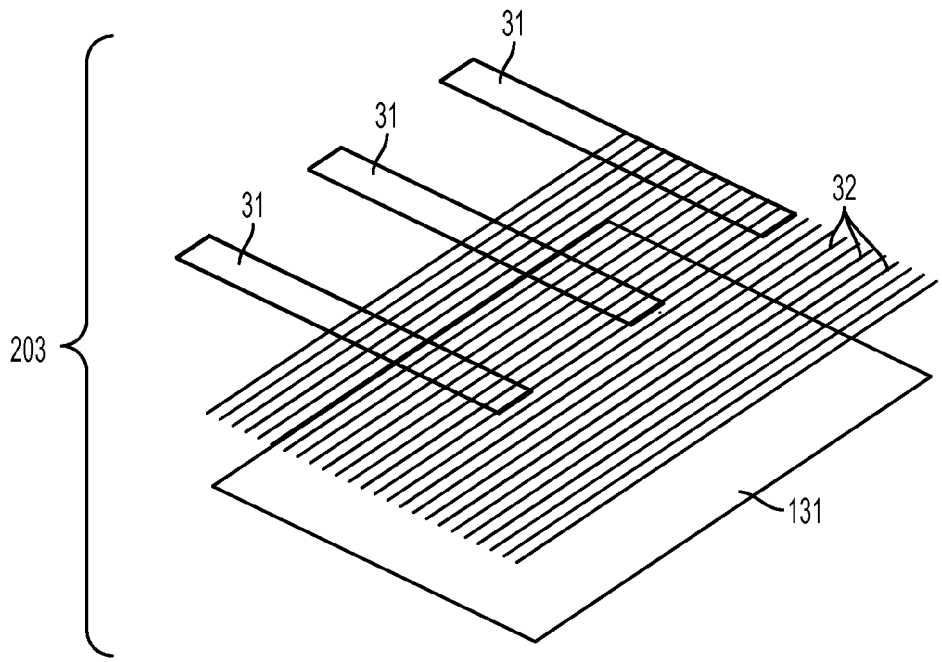
FIG. 15 is an exploded, perspective view of a third alternative tensioning structure made in accordance with the present disclosure.
Figure 16:
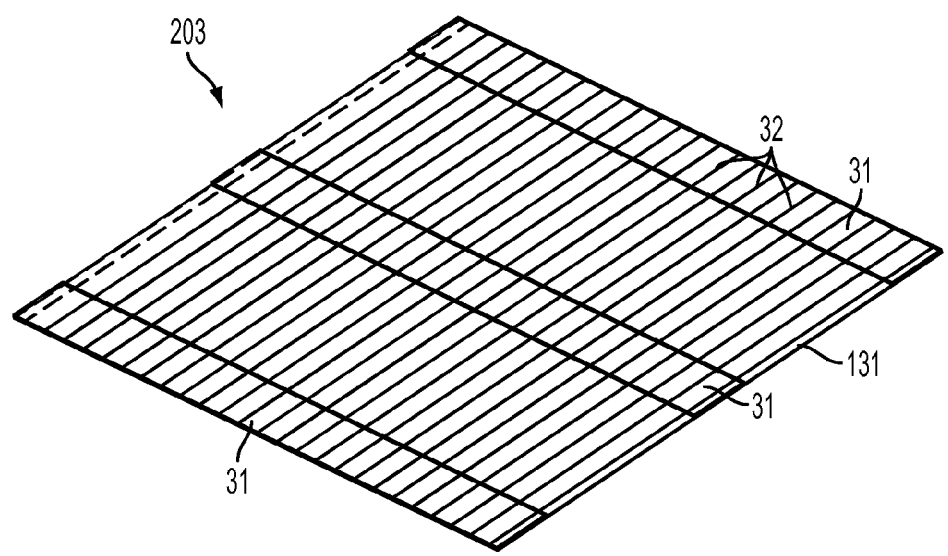
FIG. 16 is an assembled, perspective view of the third alternative tensioning structure shown in FIG. 15.

FIGS. 15 and 16 illustrate tensioning structure 203, which is substantially similar to tensioning structure 3 described above, with reference numerals of structure 203 analogous to the reference numerals used in structure 3, except with 200 added thereto. Elements of structure 203 correspond to similar elements denoted by corresponding reference numerals of structure 3, except as otherwise noted. However, structure 203 represents a hybrid approach combining elements of tensioning structures 3 and 103, in which a plurality of weld strips 31 are used to encapsulate a portion of strands 32 between strips 31 and weld sheet 131. The addition of weld strips 31 to the weld sheet 131 improves the strength of the weld connection between tensioning structure 203 and the adjacent product material (e.g., upper and/or lower material 1, 2 of inflatable bed 10 shown in FIGS. 2 and 3).

Figure 17:
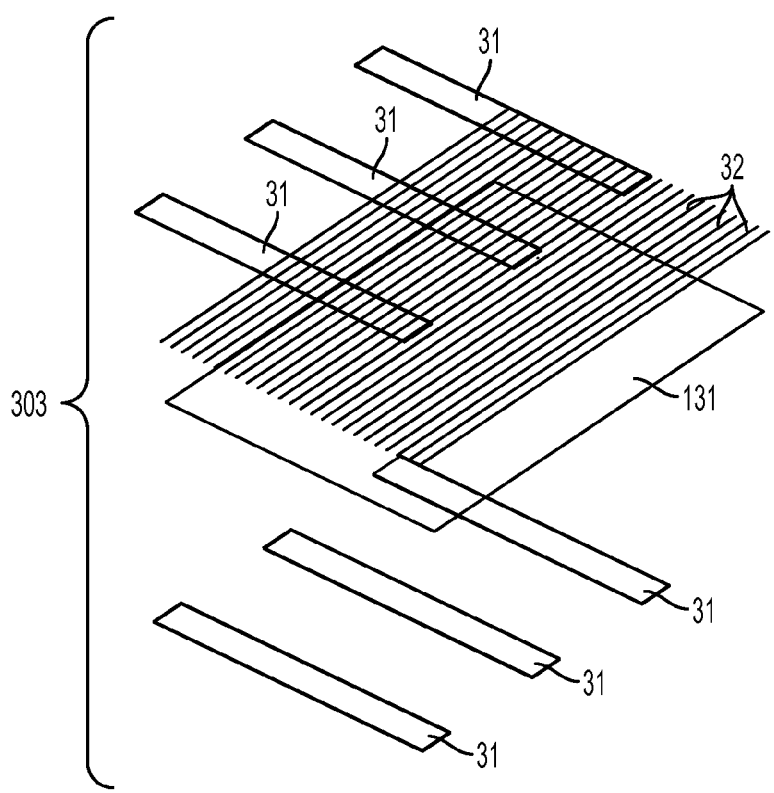
FIG. 17 is an exploded, perspective view of a fourth alternative tensioning structure made in accordance with the present disclosure.

FIG. 17 illustrates tensioning structure 303, which is substantially similar to tensioning structure 3 described above, with reference numerals of structure 303 analogous to the reference numerals used in structure 3, except with 300 added thereto. Elements of structure 303 correspond to similar elements denoted by corresponding reference numerals of structure 3, except as otherwise noted. Moreover, structure 303 incorporates all the elements of tensioning structure 203 but adds a second, lower layer of weld strips 31 attached to weld sheet 131 opposite the first, upper layer of weld strips 31. Thus, there is a dual-layer structure of opposing weld strips 31 further augmenting weld sheet 131, rendering tensioning structure 303 very strong and robust both along the extent of strands 32 and at the weld between strands 32 and the adjacent material, e.g., material 1, 2 of inflatable bed 10 (FIGS. 3 and 4).

Figure 18:
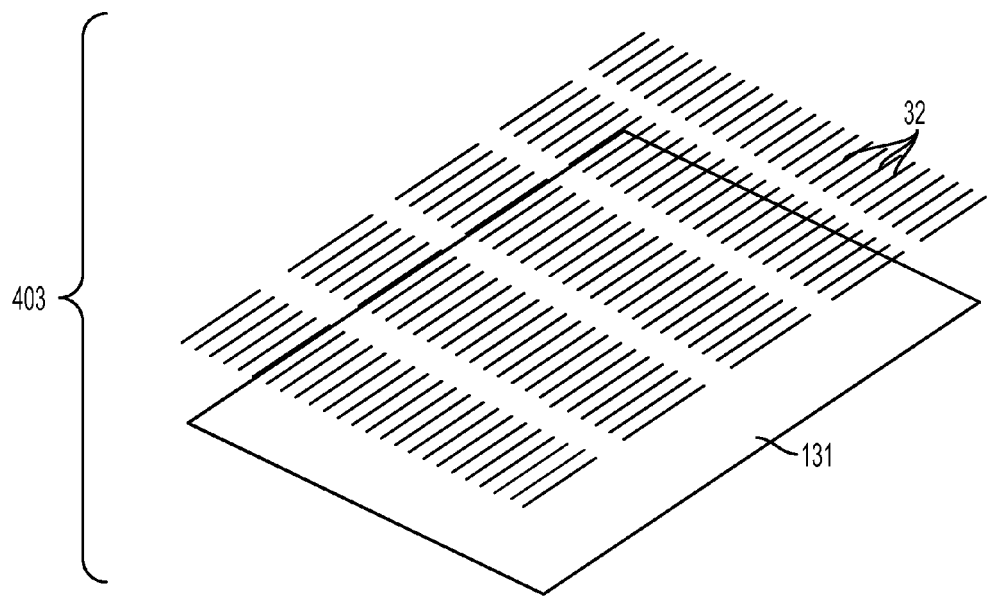
FIG. 18 is an exploded, perspective view of a fifth alternative tensioning structure made in accordance with the present disclosure.
Figure 19:
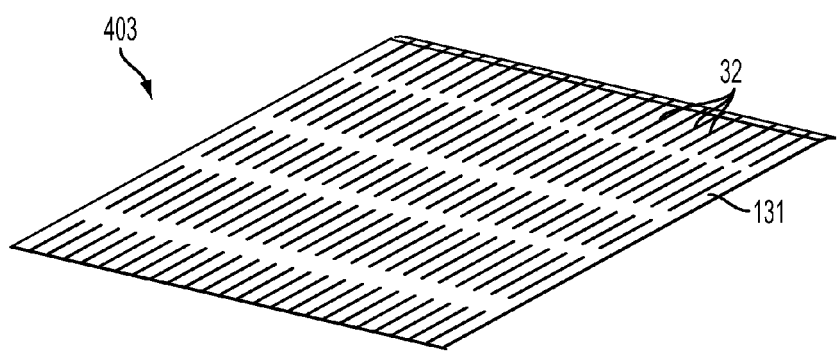
FIG. 19 is an assembled, perspective view of the fifth alternative tensioning structure shown in FIG. 18.

Turning to FIGS. 18 and 19, yet another tensioning structure 403 is illustrated. Tensioning structure 403 is substantially similar to tensioning structure 3 described above, with reference numerals of structure 403 analogous to the reference numerals used in structure 3, except with 400 added thereto. Elements of structure 403 correspond to similar elements denoted by corresponding reference numerals of structure 3, except as otherwise noted. However, the plurality of strands 32 used in structure 403 are discontinuous. As shown in FIGS. 13 and 14, the plurality of strands 32 may be trimmed to any desired length, and then affixed to weld sheet 131 by hot pressing. Upon installation into an inflatable product use, the affixed strands 32 may be cut to length, and welded into place as described above. Thus, using tensioning structures 403 has the potential to reduce consumption of the material used for strands 32 and avoid unnecessary waste thereof, thereby lower material cost.

Figure 20:
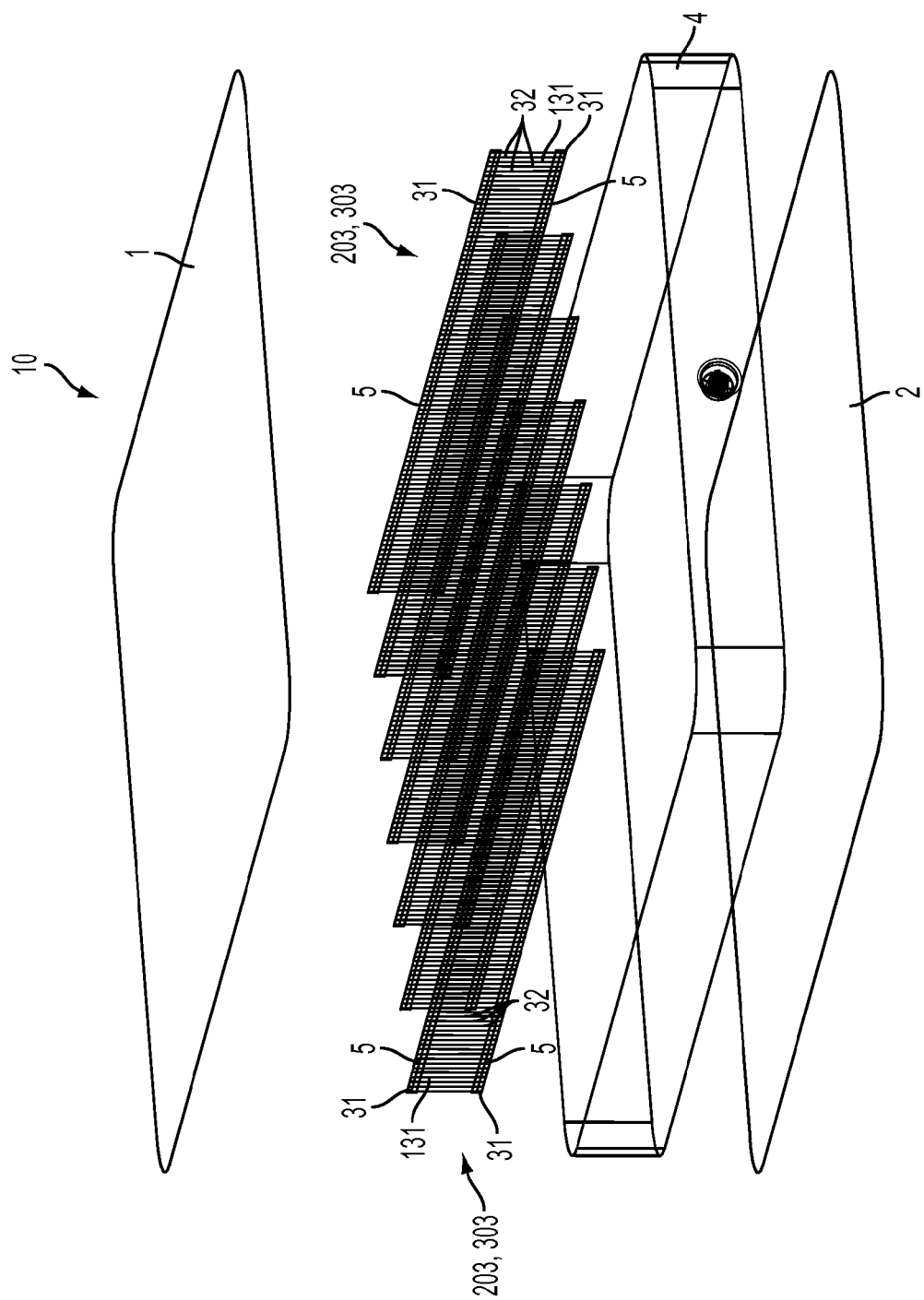
FIG. 20 is an exploded, perspective view of an inflatable bed incorporating alternative tensioning structures made in accordance with the present disclosure.

Optionally, as shown in FIG. 20, each end of the weld sheet 131 (i.e., at the ends of strands 32) may include a reinforcing strand 5 arranged similarly to tensioning structure 3 discussed above. Reinforcing strands 5 are omitted from FIG. 21 for clarity.

Figure 21:
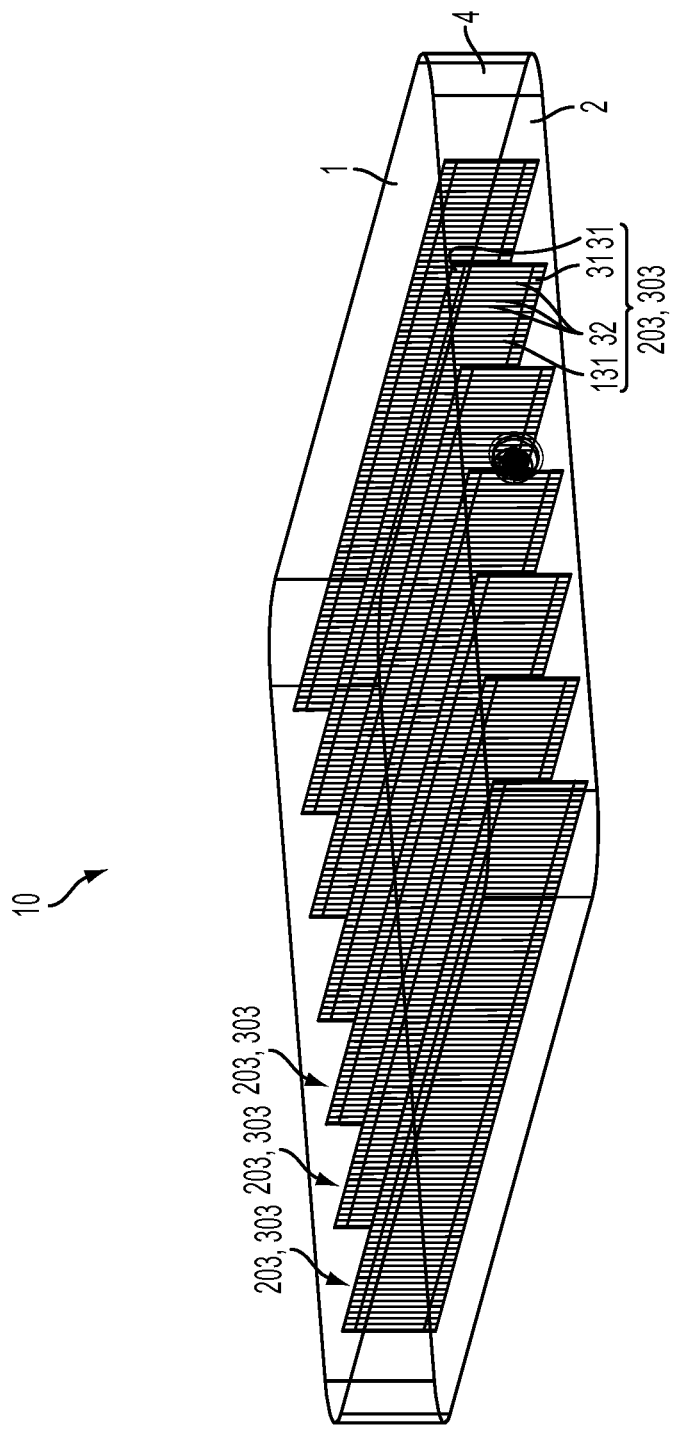
FIG. 21 is an assembled view of the inflatable bed of FIG. 22, in which the inflatable bed material is made transparent to show the internal arrangement of the tensioning structures.

The sheet-backed embodiments illustrated as tensioning structures 103, 203, 303 and 403 in FIGS. 12-19 may be integrated into an inflatable device in a similar fashion as tensioning structures 3 described above. For example, FIGS. 20 and 21 illustrate integration of tensioning structures 103 into inflatable bed 10, which is accomplished by the same method as described above.

Figure 22:
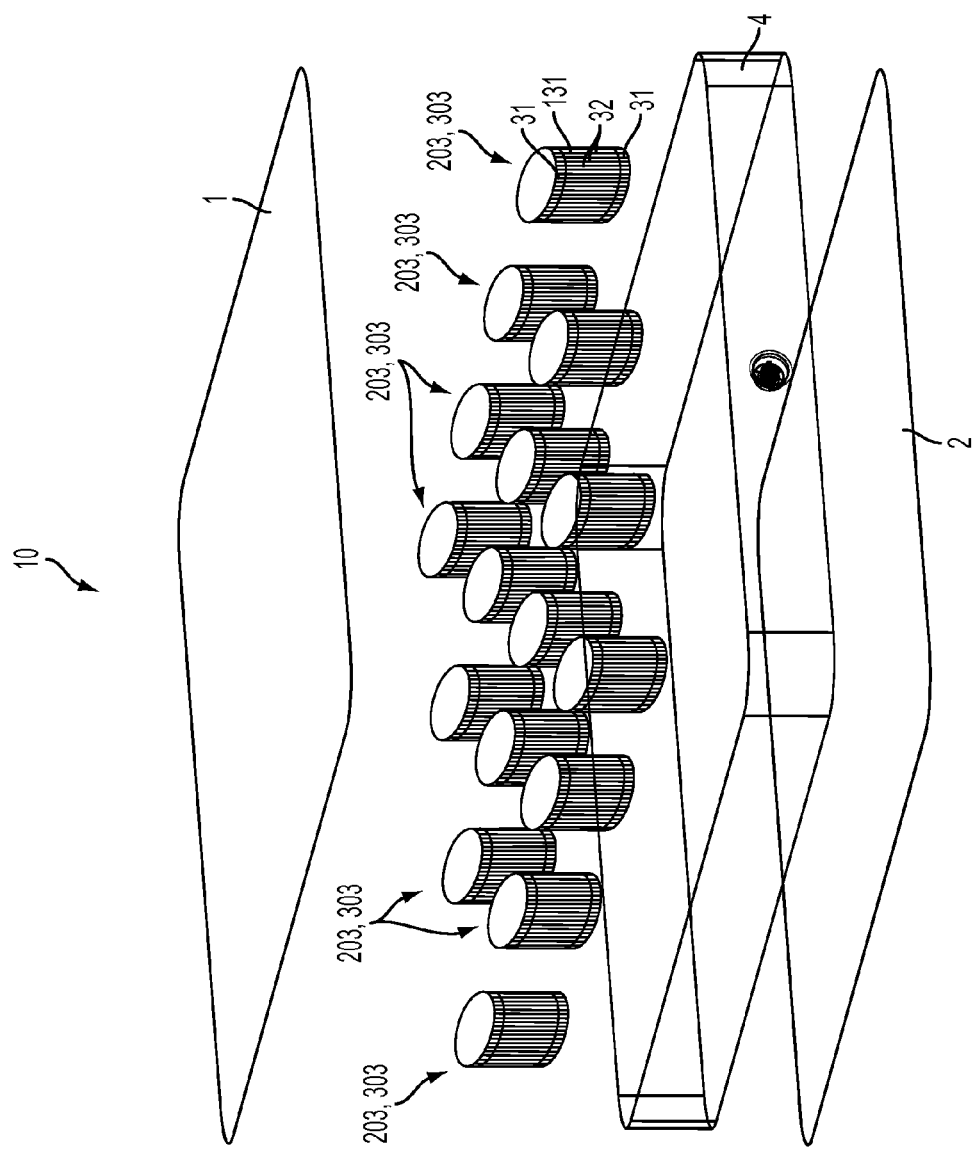
FIG. 22 is an exploded, perspective view of an inflatable bed incorporating an alternative tensioning structures made in accordance with the present disclosure, configured in an alternative geometric arrangement.
Figure 23:
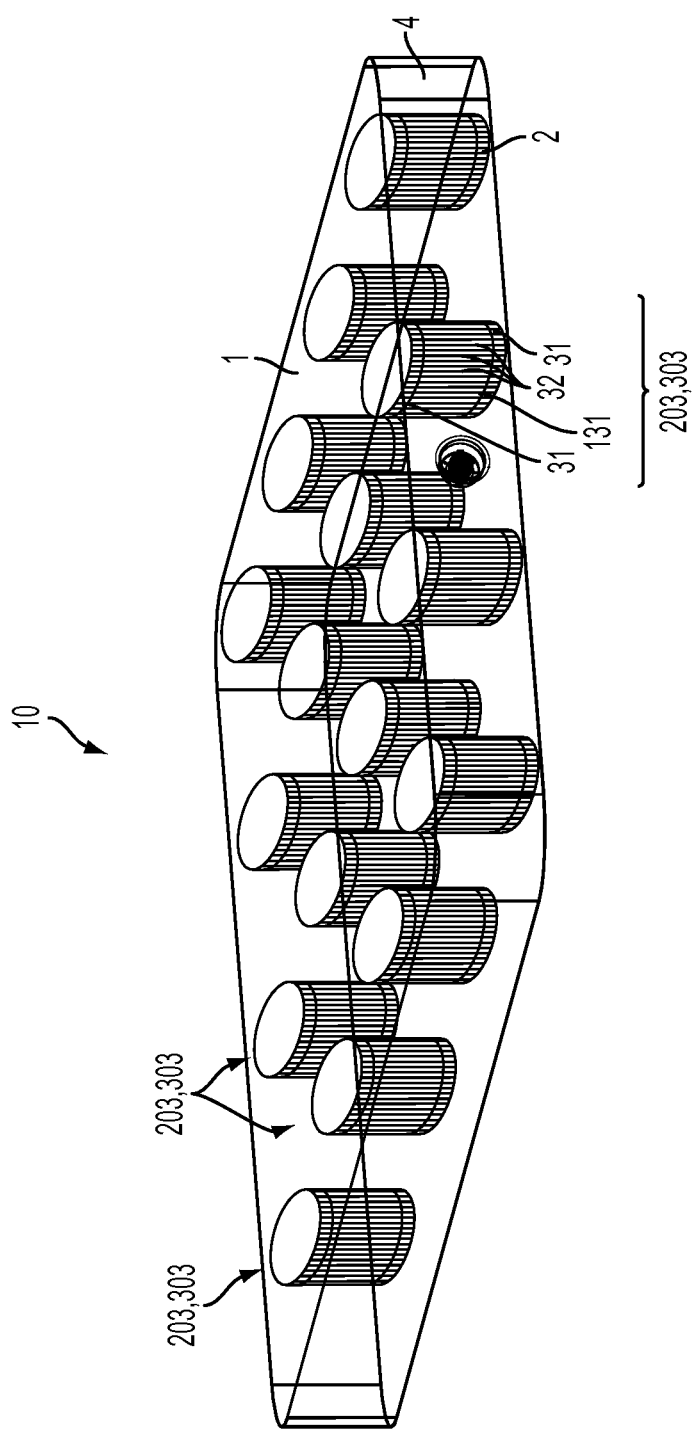
FIG. 23 is an assembled view of the inflatable bed of FIG. 22, in which the inflatable bed material is made transparent to show the internal spatial arrangement of the tensioning structures.

Tensioning structures 103, 203, 303 and 403 may also be formed into a variety of geometric configurations, as discussed above with respect to tensioning structure 3. These configurations include a wave-like path, I-shaped path, Z-shaped path or V-shaped path. As illustrated in FIGS. 22 and 23, is a cylindrical or columnar arrangement may also be utilized. In this arrangement, weld sheet 131 (and upper and lower weld strips 31, if present) is connected at its ends in an end-to-end manner to form an arcuate ring, such as a circular ring as illustrated. The plurality of strands 32 between thus cooperate with the material of weld sheet 131 to form a closed columnar periphery, thereby forming the body of a column. The axial ends of this columnar structure can then be welded to upper material 1 and lower material 2, respectively, of inflatable bed 10.

Figure 24:
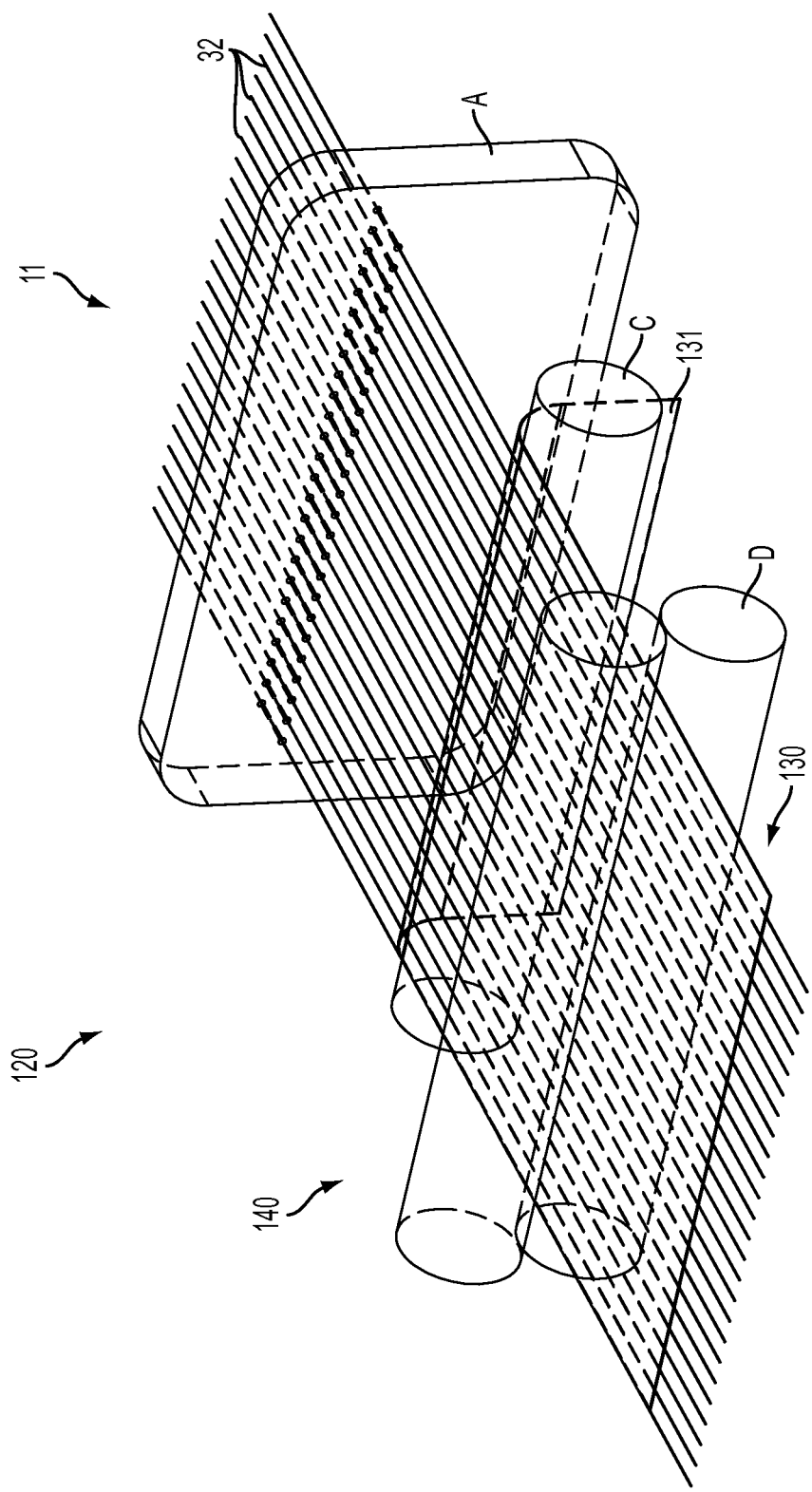
FIG. 24 is a perspective view of an apparatus for producing bulk material for the first through fifth alternative tensioning structures shown in FIGS. 12-19.

Turning now to FIG. 24, an apparatus 120 suitable for manufacturing tensioning structures 103, 203, 303 or 403 is shown. Operation of apparatus 120 is accomplished by first supplying a plurality of strands 32 from a yarn stand or other stock of yard, as described above with respect to apparatus 20. Strands 32 are continuously delivered via strand guide A, described above, which provides uniformly spaced apart and parallel strands 32 to the downstream welder 140.

Welder 140 includes a conveying roller C downstream of strand guide A, which continuously delivers a weld sheet 131 of width sufficient to correspond to the width of the plurality of strands 32. Downstream of roller C, the plurality of strands 32 are near to or abutting weld sheet 131.

The plurality of strands 32 and weld sheet 131 then advance together through hot roller D, which heats and compresses the material such that strands 32 become fixed to the softened material of weld sheet 131. After passage through roller D, tensioning structure 103 as shown in FIG. 13 is complete. The bulk material for tensioning structure 103 may be wound onto a take-up spool for later cutting into a tensioning structure 103 of appropriate size for a particular application.

When the thus tensioning structure 103 is applied to an inflatable product such as inflatable bed 10 (FIGS. 21 and 22), the weld sheet 131 may have a relatively small thickness given the level of internal pressure (and, therefore, tension) expected to be encountered by structure 103 during inflation and use of the product. For example, the thickness may be reduced by 20%-40% with respect known internal tensioning structures lacking strands 32. Because strands 32 are positioned and configured to bear the tensile loads applied to tensioning structure 103, weld sheet 131 need only provide for proper positioning and protection of the plurality of strands 32, such as to avoid knotting or damage of strands 32 during practical use. In one exemplary embodiment, the thickness of weld sheet 131 may be as small as 0.10 millimeters.

Where a second weld sheet 131 is added to tensioning structure 103, as shown in FIG. 14 and described above, a second roller C (not shown) may be provided opposite the illustrated roller C of FIG. 24, such that rollers C are disposed on either side of strands 32. Both sheets 131 are then passed through the hot pressing roller D, capturing strands 32 between the two layers of plastic sheets.

Where a plurality of weld strips 31 are added to create tensioning structure 203, as shown in FIGS. 15 and 16 and described above, a finished tensioning structure 103 made using apparatus 120 may be further processed using apparatus 20 as shown in FIG. 7 and described above. After the intermediate sheeted product equivalent to tensioning structure 103 exiting from hot rollers D, weld strips 31 may be added to one or both sides of the intermediate sheeted product. At least one reinforcement strand 5 may be added as required or desired, such that reinforcement strands 5 are perpendicular to the plurality of strands 32, as described in detail above.

Where weld strips 31 are added to both sides of a sheeted intermediate product to create tensioning structure 303, a process similar to the above may be employed in which an intermediate sheeted product exits rollers D and receives additional weld strips 31. However, weld strips 31 are added to both sides instead of to a single side, in accordance with the method of manufacturing a dual-layer version of bulk material 30 using welder 40 as described above. Of course, at least one reinforcement strand 5 may be added in a similar fashion as previously described.

3. Weld Strips Joined by V-Shaped Strands.

Figure 25:
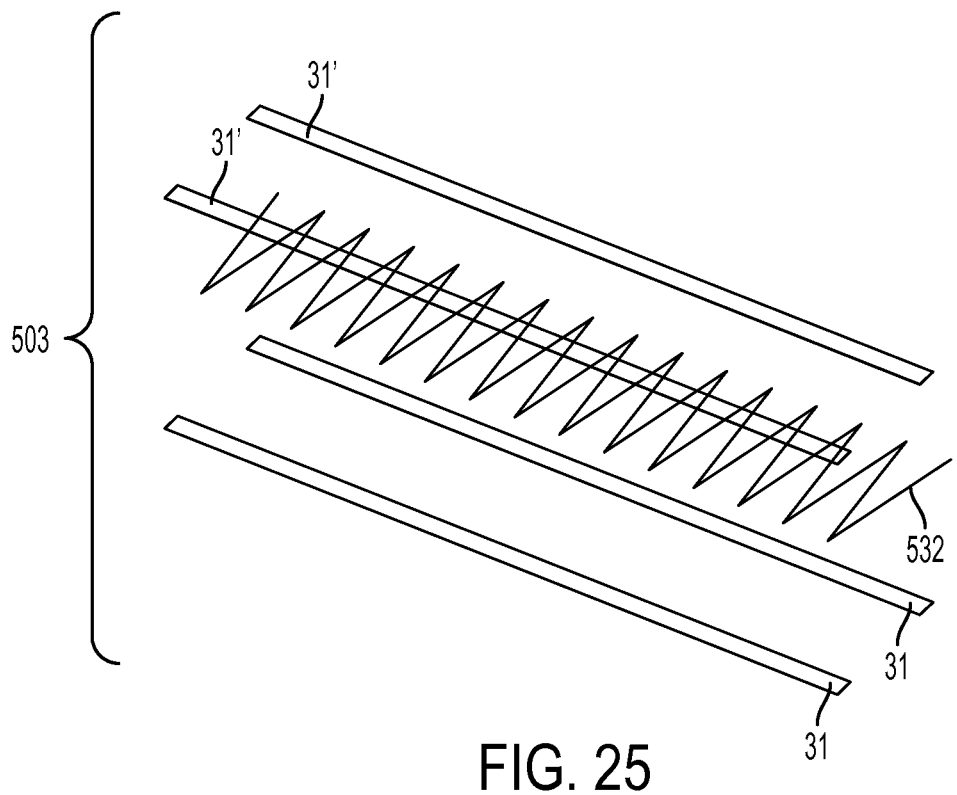
FIG. 25 is an exploded, perspective view of a sixth alternative tensioning structure made in accordance with the present disclosure.
Figure 26:
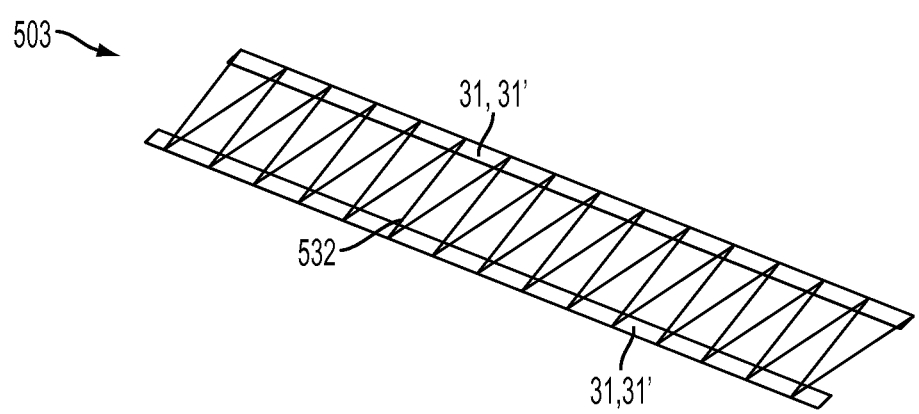
FIG. 26 is an assembled, perspective view of the sixth alternative tensioning structure shown in FIG. 25.
Figure 27:
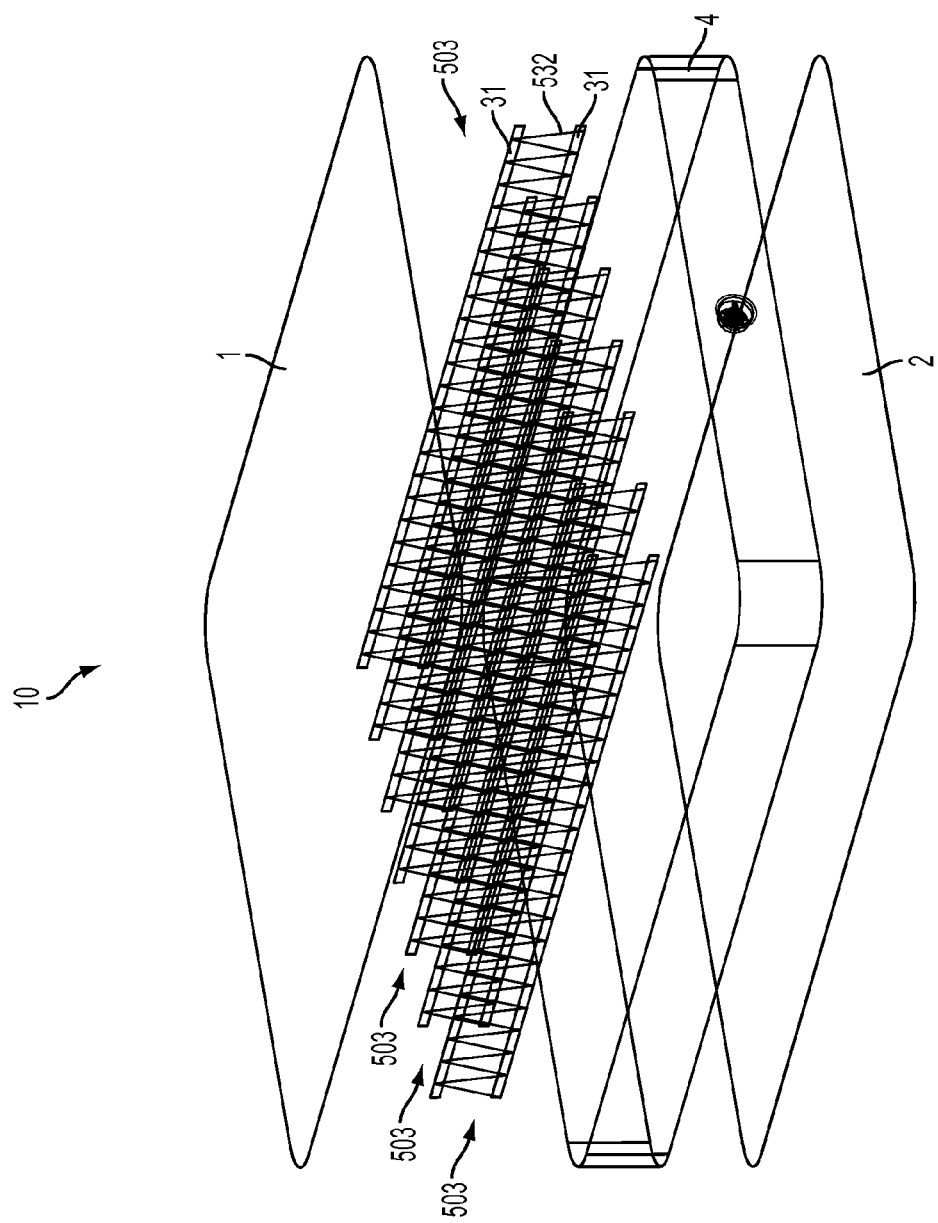
FIG. 27 is an exploded, perspective view of an inflatable bed incorporating the sixth alternative tensioning structure shown in FIG. 25.
Figure 28:
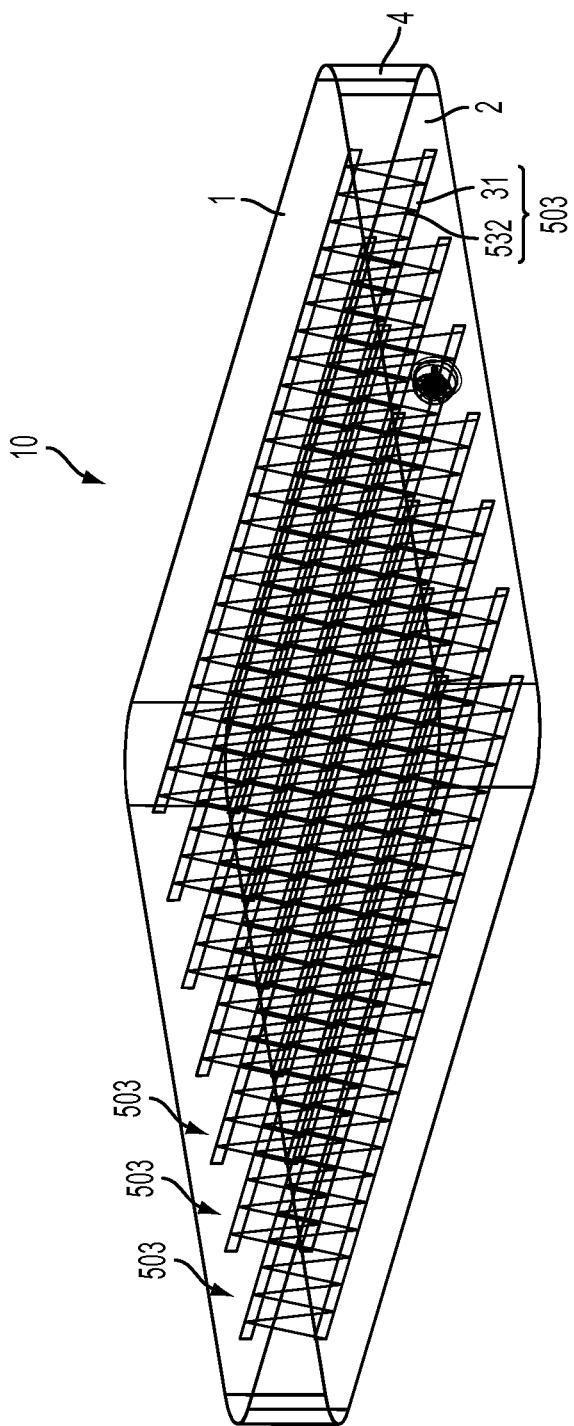
FIG. 28 is an assembled view of the inflatable bed of FIG. 27, in which the inflatable bed material is made transparent to show the internal arrangement of the tensioning structures.

An alternatively arranged tensioning structure is shown in FIGS. 25 and 26 as tensioning structure 503. Structure 503 is substantially similar to tensioning structure 3 described above, with reference numerals of structure 503 analogous to the reference numerals used in structure 3, except with 500 added thereto. Elements of structure 503 correspond to similar elements denoted by corresponding reference numerals of structure 3, except as otherwise noted.

1. However, strand 532 in tensioning structure 503 have a staggered, V-shaped arrangement, and may be formed from a single strand wound back and forth rather than a plurality of separate and discrete strands as used in tensioning structure 3 for example. As described below in the context of the method of manufacture of tensioning structure 503, strand 532 may be a single, continuous strand woven between weld strips 31, 31', with the point of each "V" affixed to at least one of the weld strips 31, 31'. Strands 532 (and reinforcing strands 5, if provided) cooperate to define a tensile sheet. Strands 532 cooperate to define a plurality of V-shaped portions of the tensile sheet. Some of the V-shaped portions are inverted relative to other V-shaped portions. The V-shaped portions of the tensile sheet extend between one pair of strips 31 to the other pair of weld strips and extend from the longitudinal edges of the respective weld strips 31.

Figure 29:
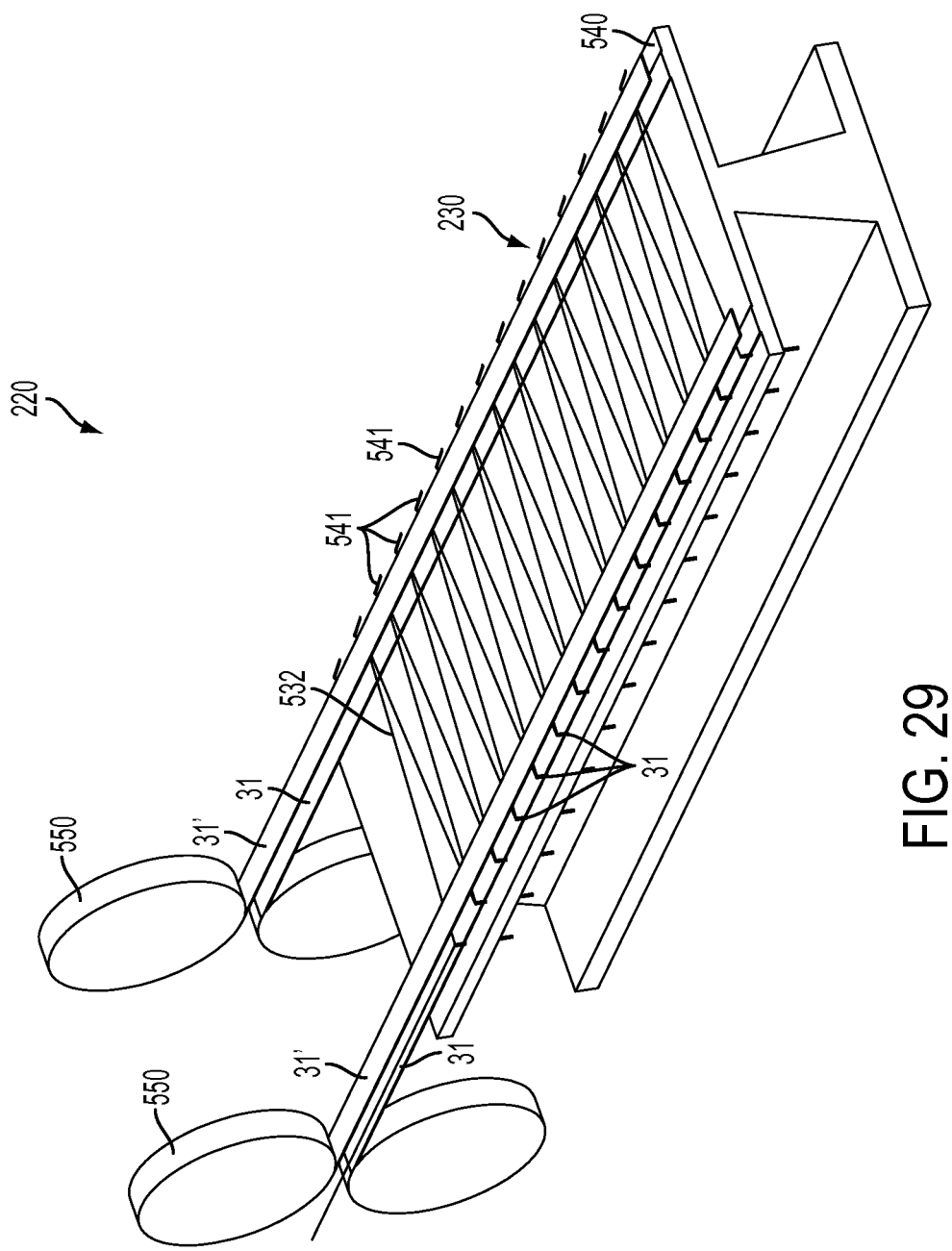
FIG. 29 is a perspective view of an apparatus for producing bulk material for the sixth alternative tensioning structures shown in FIGS. 25-28.

Turning now to FIG. 29, an apparatus 220 suitable for manufacturing tensioning structure 503 is shown. Operation of apparatus 220 is accomplished by disposing a lower pair of weld strips 31 such that the lower pair are substantially parallel and spaced apart upon joining device 540. In the illustrated embodiment, weld strips 31 are unspooled from rolls of weld strip material contained within a pair of unreeling devices 550.

Next, continuous strand 532 is wrapped successively around a set of adjacent hook-shaped members 541 disposed at either side of joining device 540, with the plurality of hook-shaped members 541 arranged in two respective rows corresponding to the location of the previously-placed lower pair of weld strips 31. In an exemplary embodiment, hook-shaped members 541 are uniformly spaced from one another and arranged at the outer sides of lower pair of weld strips 31, with each row of hook-shaped members 541 offset with respect to the other row. With this arrangement, the continuous strand 532 forms a plurality of end-to-end "V" shaped strands when wrapped around successive hook-shaped members 541 in alternating rows thereof, as shown. That is to say, the corner of each "V" is formed at a respective hook-shaped members 541, and successive corners traced along continuous strand 532 will alternate between rows of hook-shaped members 541.

Next, a second pair of weld strips 31' are positioned over the first pair of weld strips 31, respectively, and are clamped thereto such that each "V" shaped corner formed by strand 532 is disposed between one of the first pair of weld strips 31 and the abutting one of the second pair of weld strips 31'. The second pair of weld strips 31' may also be unspooled from unreeling devices 550.

Finally, the abutting pairs of weld strips 31, 31' are joined to one another and to strand 532, such as by welding or by one of the other attachment methods discussed above. For example, weld strips 31, 31', may be joined by a high frequency welder or another thermofusion device. It is also contemplated that strand 532 can be fixed to weld strips 31, 31', and weld strips 31 can be fixed to weld strips 31', by adhesive or by sewing.

As with other tensioning structures discussed above, tensioning structure 503 may be produced and stored in bulk and later applied to various inflatable products. The length and width of tensioning structure 503 may be trimmed to accommodate the internal length or width of the inflatable product.

In one alternative embodiment, it may be not necessary to provide the second layer of weld strips 31', and instead to fix only the first layer of weld strips 31 to the strand 532. Fixing strand 532 to the single layer of weld strips 31 may be accomplished in a similar fashion to the single-layer weld strip and weld sheet embodiments described above.

Figure 30:
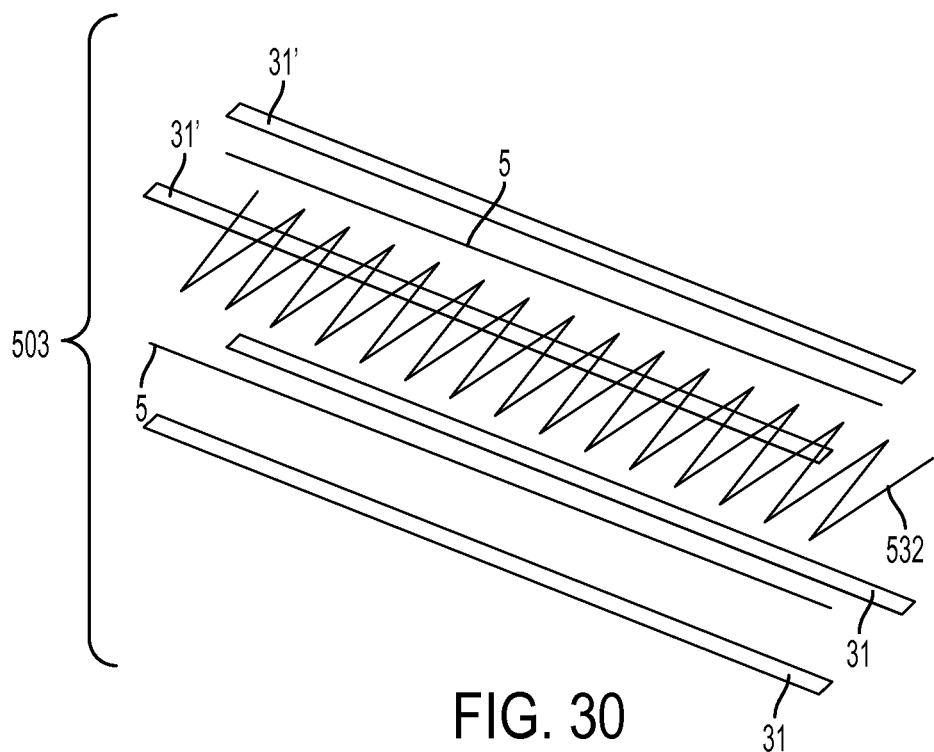
FIG. 30 is an exploded, perspective view of a seventh alternative tensioning structure made in accordance with the present disclosure.
Figure 31:
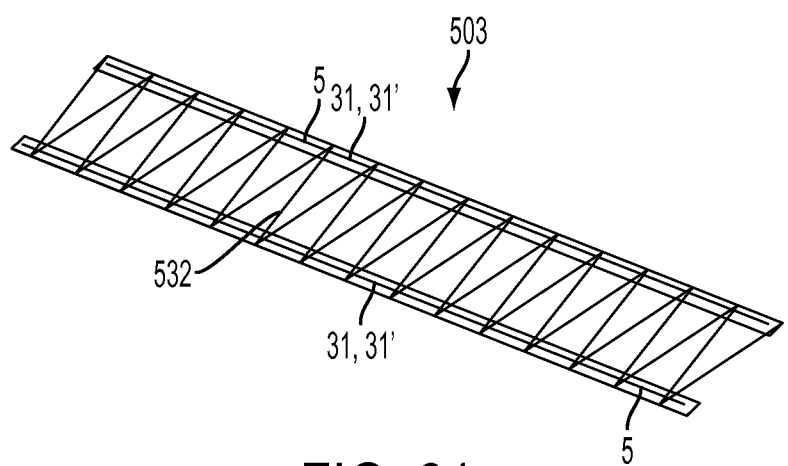
FIG. 31 is an assembled, perspective view of the seventh alternative tensioning structure shown in FIG. 30.
Figure 32:
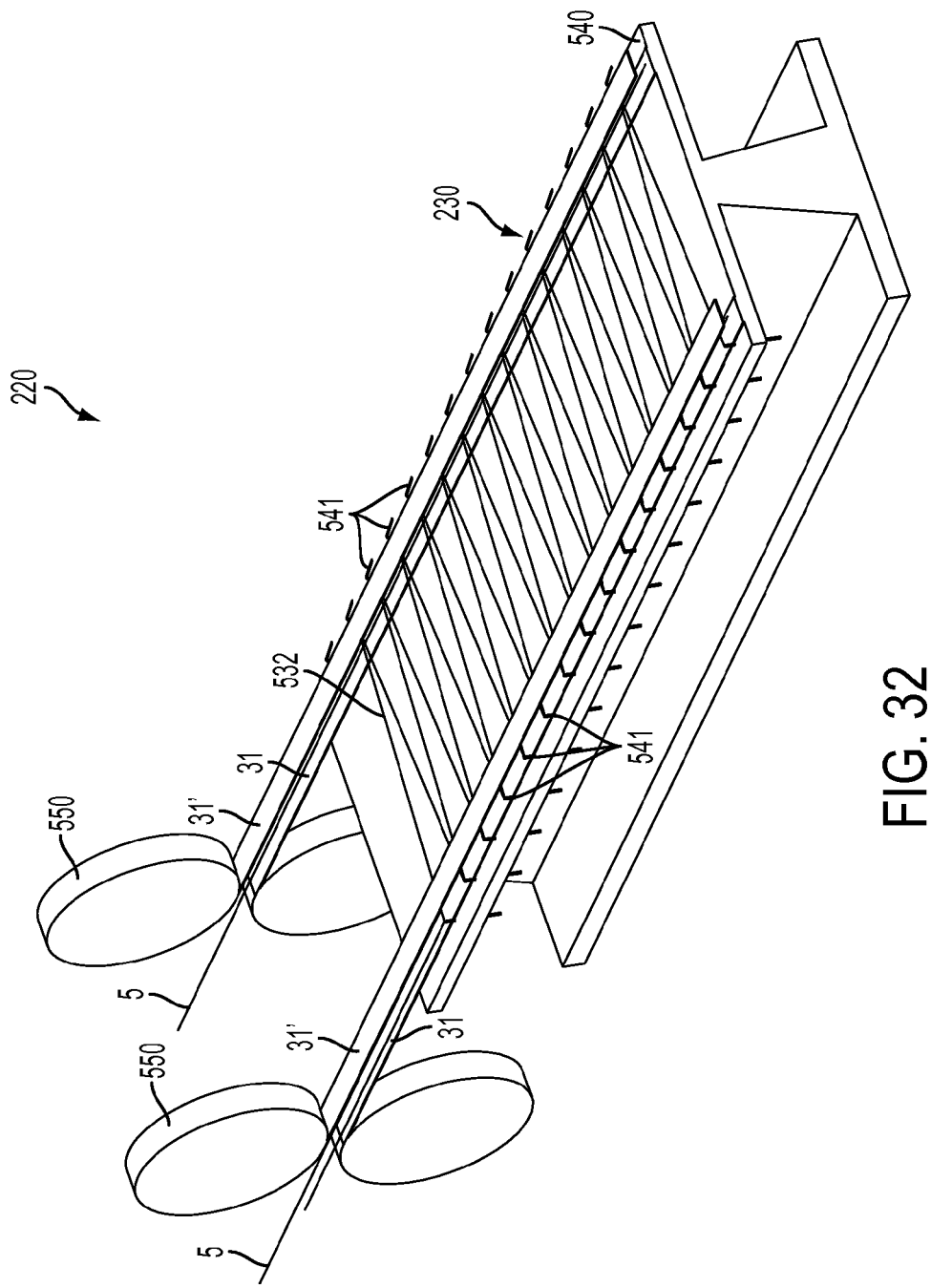
FIG. 32 is a perspective view of an apparatus for producing bulk material for the seventh alternative tensioning structures shown in FIGS. 30 and 31.

Turning to FIGS. 30-32 tensioning structure 503 may also be provided with at least one reinforcement strand 5 extending along the longitudinal extent of at least one of weld strips 31, 31'. Similar to the uses of reinforcement strands 5 in the embodiments described above, reinforcement strands 5 may be arranged on one of the lower pair of weld strips 31 and/or between the lower and upper pairs of weld strips 31, 31'.

A tensioning structure in accordance with the present disclosure, including tensioning structures 3, 103, 203, 303, 403 and 503 discussed above, has a high tensile strength along the axial extent of the strands 32, 532 extending between respective weld strips and/or along weld sheets. This high tensile strength is complemented with a full-strength weld between the adjacent material of an inflatable product, which is facilitated by the full surface-area contact provided by the weld strip and/or weld sheet interface between strands 32, 532 and such adjacent material. In this way, the tensioning structure performs well an internal structure of the inflatable product, while facilitating an overall reduction in weight and deflated/folded volume of the inflatable product. For example, a loose arrangement of strands 32 is significantly lighter than a one-piece sheet of comparable size and tensile strength.

Where weld sheets 131 are employed, such sheets act to ensure a consistent position and arrangement of the plurality of strands 32 (or 532), thereby prevent such strands from becoming wound or otherwise entangled with one another. Meanwhile, weld strips 31 can be utilized to provide a robust structure for welding the tensioning structure into the inflatable product, thereby ensuring that the high tensile strength offered by the strands of the tensioning structure is fully realized. In addition, the use of weld sheet 131 can significantly reduce the weight of the entire inflatable product with respect to a traditional, relatively thicker one-piece sheet which is also responsible for handling tensile loading. In other words, weld sheet 131 reduces by 20%-40% in thickness with respect to an existing tensioning structures having comparable thicknesses of 0.36 mm to 0.8 mm as noted above.

Figure 33:
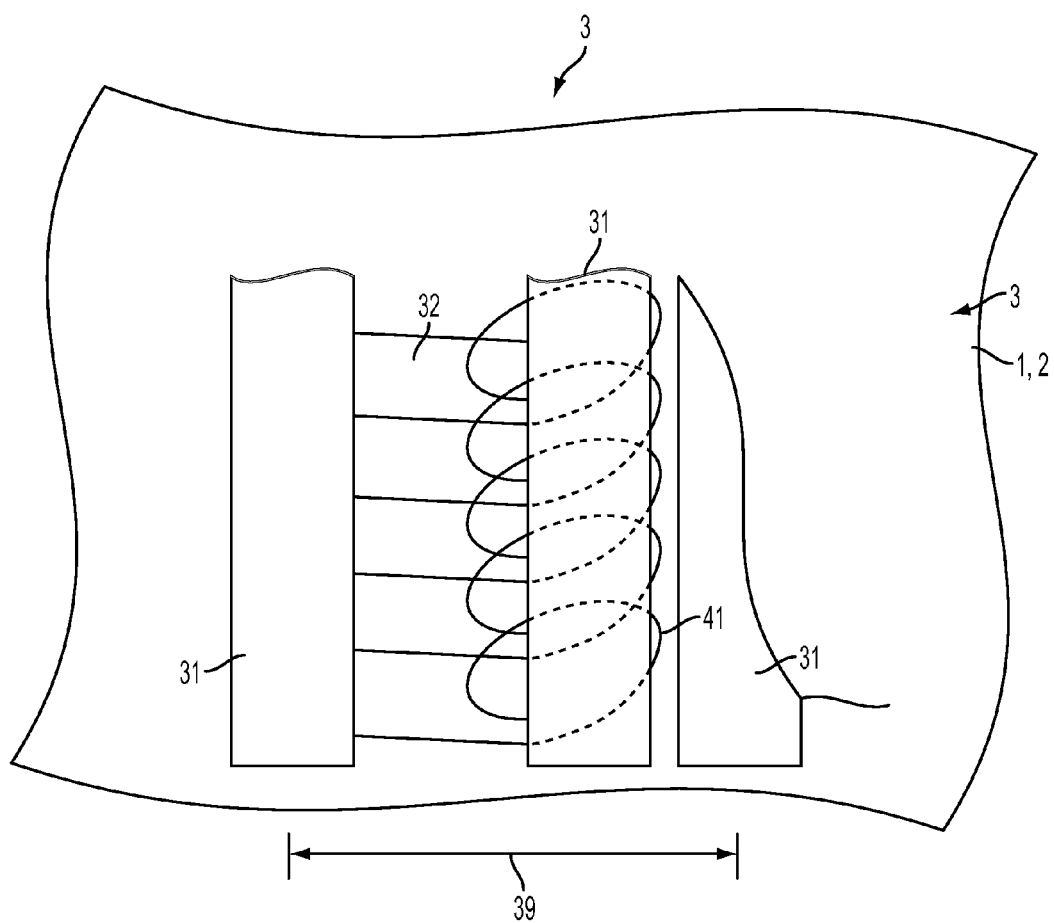
FIG. 33 is a top plan view of portions of tensioning structures bunched together during a welding process.

As illustrated in FIG. 33, tensioning structures 3 have a distance 39 between adjacent tensioning structures 3. As discussed above, strands 32 have a length 37 that approximates a height 37 of tensioning structures 3 when mattress 10 is inflated. During construction of typical mattresses using PVC tensioning structures (not shown), the height of PVC tensioning structures is practically limited by the distance between adjacent PVC tensioning structures. This limitation is the result of the typical manufacturing process wherein the PVC tensioning structures are all aligned on a lower sheet 2 and simultaneously welded to lower sheet 2. If the PVC tensioning structures are too tall, they will overlap adjacent PVC tensioning structures causing adjacent PVC tensioning structures to be welded together and resulting in dysfunctional PVC tensioning structures. To increase the height of PVC tensioning structures, the PVC tensioning structures may be folded in half along their length while one edge is being welded. By folding the PVC tensioning structure, the maximum height may be increased to slightly less than twice the distance between adjacent PVC tensioning structures (ex. 15 millimeters less than twice the height of the PVC tensioning structure). Providing more than one fold is impracticable.

Because gap portions 33 of tensioning structures 3 are made of strands 32 rather than typical PVC sheets discussed above, they are much more flexible than typical PVC tensioning structures. As a result of this flexibility, mattresses 10 can be readily manufactured having heights 37 greater than twice distance 39 between adjacent tensioning structures 3.

During manufacture, weld strips 31 of each of the plurality of tensioning structures 3 are aligned in their respective position for welding to lower sheet 1. The other weld strip 31 of these tensioning structures 3 are moved adjacent to the weld strip 31 to be welded as shown in FIG. 33. Because of their flexibility, strands 32 bunch on top of themselves or on top of nearby strands 32 allowing multiple layers of strands 32 to readily lie on top of one another. By allowing multiple layers of strands 32 to lie on top of each other, height 37 of tensioning structures 3 can be greater than twice distance 39 between tensioning structures 3. According to embodiments, length 37 of strands 32 may be 2, 2.5, 3, 3.5, 4, 4.5, 5, 5.5, 6 or more times longer than distance 39 between tensioning structures 3.

As shown in FIG. 33, loops 41 form in strands 32 during bunching and portions of strands 32 may be positioned under weld strip 31 that is currently not being welded. Although each strand 32 shown in FIG. 33 only has one loop 41 and is only overlapping one other strand 32, each strand 32 may have multiple loops 41 and may overlap multiple other strands 32, particularly when the distance between stands 32 along weld strips 31 is shorter than that illustrated in FIG. 33.

Figure 35:
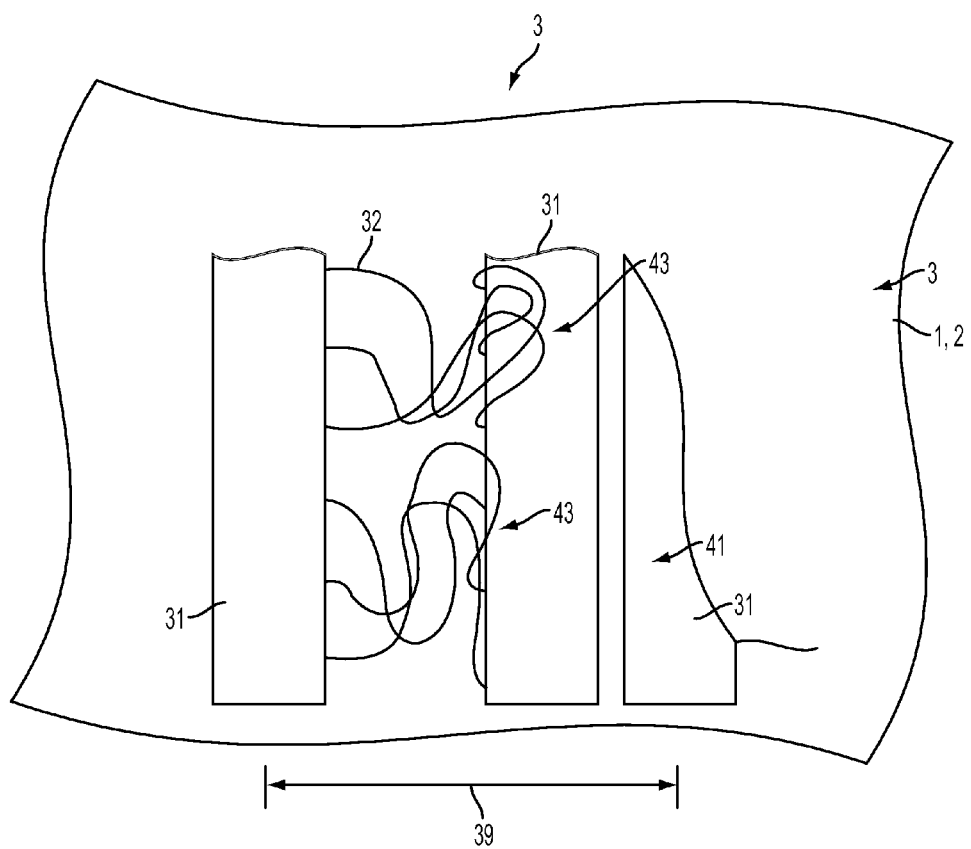
FIG. 35 is a view similar to FIG. 33 showing portions of tensioning structures with strands placed in piles during a welding process.
Figure 36:
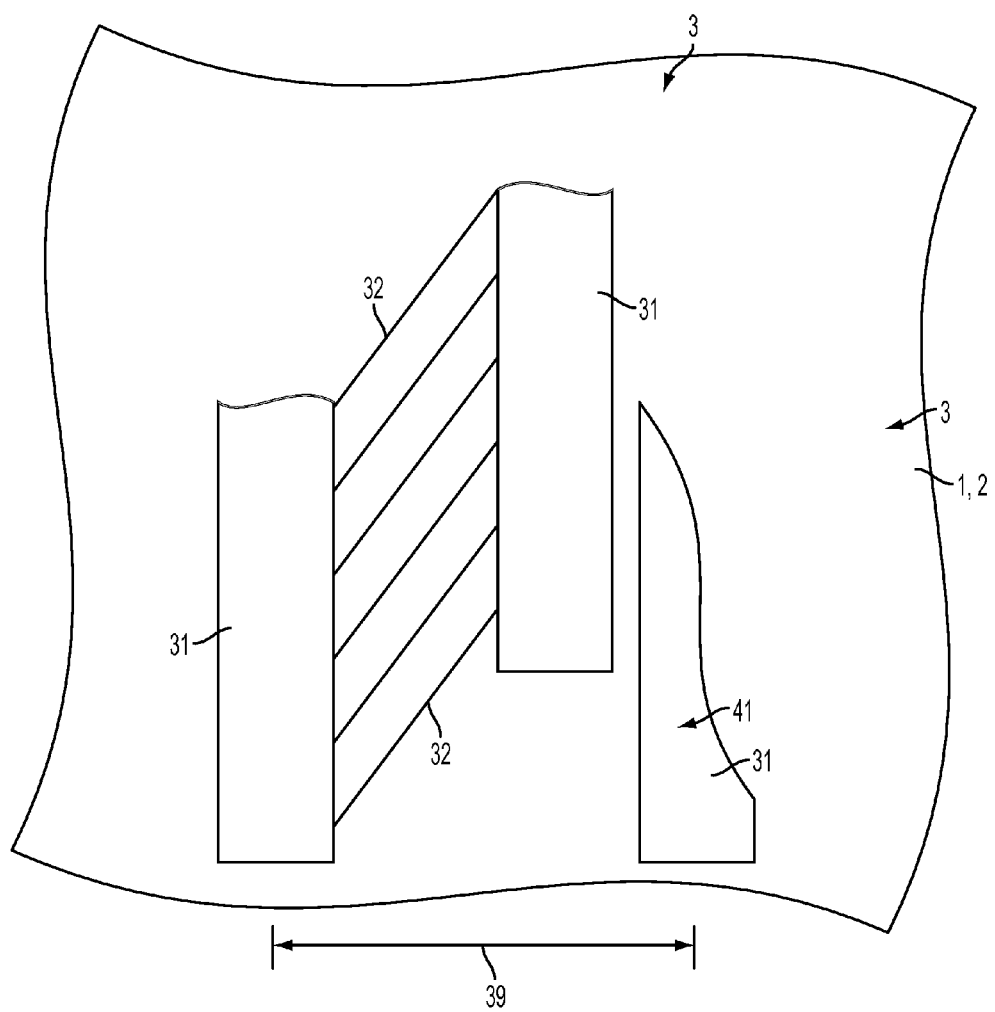
FIG. 36 is a view similar to FIG. 33 showing portions of tensioning structures shifted relative to each other during a welding process.

In addition to the bunching arrangement shown in FIG. 33 to facilitate welding of weld strips 31 to lower sheet 2, other orientations of long strands 32 can be used to prevent a portion of one tensioning structure 3 from overlapping an adjacent tensioning structure 3 during welding. For example, as shown in FIG. 35, strands may be collected in piles 43 to account for moving welds strips 31 of each tensioning structure 3 adjacent each other. The turns of piles 43 account for the decreased distance between weld strips 31 when weld strips 31 are moved together. According to another example, weld strips 31 of each tensioning structure 3 are shifted along the extent or length of tensioning structures 3 as shown in FIG. 36. The shifting results in strands 32 forming acute angles with weld strips 31 and accounts for the decreased distance between weld strips 31. By accommodating strands 32 that are longer than the distance between adjacent tensioning structures 3, tensioning structures 3 may be made taller without interfering with the process of welding tensioning structures 3 to upper and lower sheets 1, 2. As mentioned above, strands 32 may be longer than shown in FIGS. 33-36. With such longer strands 32, more or larger loops 41 (FIG. 33), larger and/or taller piles 43 (FIG. 35), or greater shifting (FIG. 36) may be used to accommodate the longer strands 32 to avoid tensioning structures 3 overlapping during welding.

When prepared for shipping or storage, mattresses 10 are deflated. During deflation, strands 32 may bunch as shown in FIG. 33. Further, strands 32 from adjacent tensioning structures 3 will contact each other and may become interleaved with strands 32 from one tensioning structure 3 positioned between strands 32 of another tensioning structure. Further, because strands 32 are very flexible, they collapse readily when contacted by other structures when mattress 10 is deflated for shipping or storage. For example, when strands 32 contact upper or lower sheets 1, 2 when deflated, they comply to upper and lower sheets 1, 2 to allow upper and lower sheets 1, 2 to compact more closely. At least partially because of this compaction, the overall deflated volume of mattress 10 is reduced when compared to mattresses using PVC sheet tensioning structures. When collapsed, strands 32 from a tensioning structure 3 may become interleaved with strands 32 from the same tensioning structure 32, loops 41 may form, piles 43 may form, and/or strands 32 may become angled to weld strips 31 in a manner similar to that shown in FIG. 36.

Figure 34:
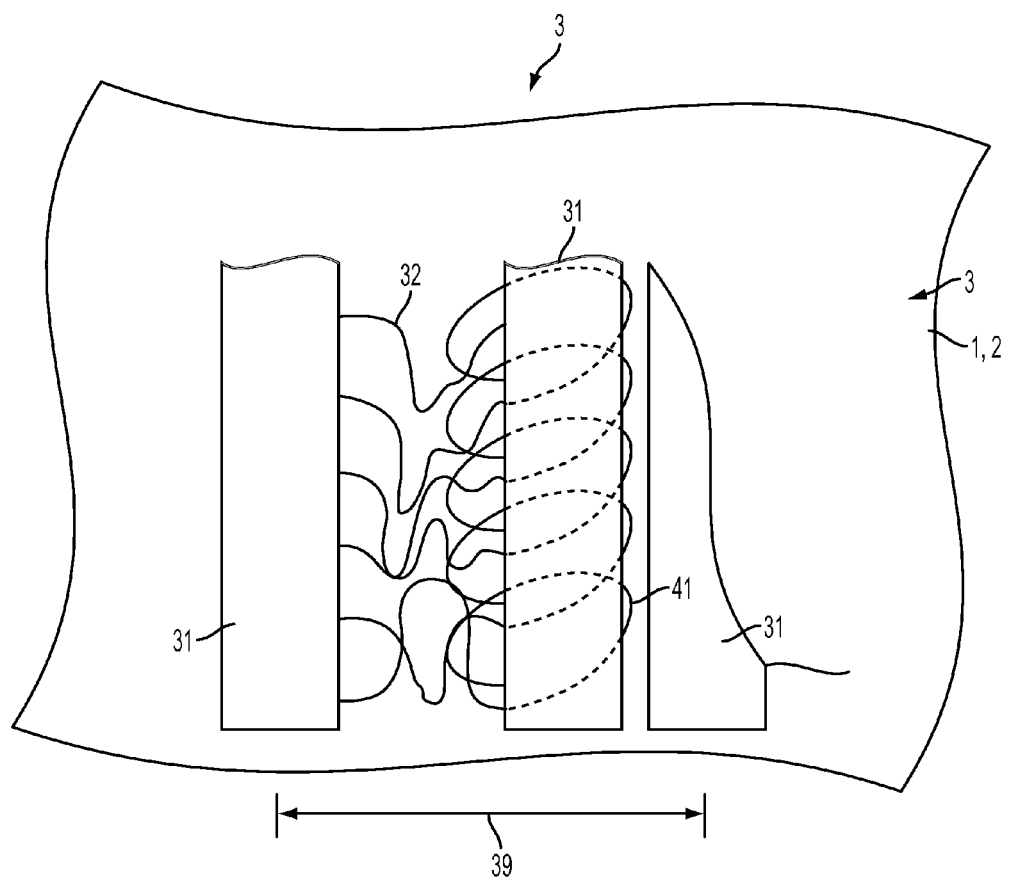
FIG. 34 is a top plan view of portions of a tensioning structure collapsed when the mattress is deflated for storage or shipment.

As shown in FIG. 34, when collapsed, strands 32 may be oriented in different directions with some overlapping as shown in the bottom two strands 32 and other following substantially the same direction as shown in the top three strands 32. Some strands 32 collapse in directions that are not perpendicular to the extent of weld strips 31. For example, the lowest-most strand 32 in FIG. 34 leaves left-most weld strip 31 is a perpendicular direction to this weld strip 31, turns up to be parallel to this weld strip 31, returns to perpendicular to this weld strip 31, turns down to be parallel to this weld strip 31, and then loops under this weld strip 31 to attached to the other weld strip 31 in a perpendicular direction to the other weld strip 31. According to some embodiments, the overall folded or deflated volume of mattress 10 may be 8-25% less than comparable mattresses with PVC sheet tensioning structures. According to the preferred embodiment, the volume is about 16% less.

A tensioning structure in accordance with the present disclosure is also a low-cost option for imparting a desired structure and shape to an inflatable device. For example, a large reduction in PVC material may be achieved by use of the present tensioning structure, as compared to a one-piece sheet of comparable size and tensile strength.

While the disclosure has been described as having exemplary designs, the present disclosure can be further modified within the spirit and scope of this invention. This application is therefore intended to cover any variations, uses or adaptations of the disclosure using its general principles. Further, this application is intended to cover such departures from the present disclosure as come within known or customary practice in the art to which this disclosure pertains.

What is claimed is:

1. A method for producing an inflatable product comprising the steps of
providing a first sheet made of weldable plastic,
providing a second sheet made of weldable plastic,
providing a plurality of tensioning structures, each tensioning structure including
at least one tensile sheet having a first side, a second side, and plurality of holes extending through the tensile sheet from the first side to the second side and
a plurality of weld strip materials made of weldable plastic, the plurality of weld strip materials including
a first weld strip material disposed on the first and second sides of the tensile sheet such that the tensile sheet is captured by the first weld strip material, and
a second weld strip material disposed on the first and second sides of the tensile sheet such that the tensile sheet is captured by the second weld strip material, the second weld strip material spaced from the first weld strip material,
a plurality of strands arranged to provide a substantially uniform height among the plurality of tensioning structures throughout the inflatable product;
welding the plurality of tensioning structures to the first sheet by welding the first weld strip material to the first sheet,
welding the plurality of tensioning structures to the second sheet by welding the second weld strip material to the second sheet,
creating an inflatable chamber defined between the first and second sheets by the step of coupling the first sheet to the second sheet, and
providing a valve in communication with the inflatable chamber to facilitate inflation and deflation of the inflatable product.

2. The method of claim 1, further comprising the step of providing a side wall, wherein the step of coupling the first sheet to the second sheet includes the step of coupling the side wall to the first sheet and coupling the side wall to the second sheet.

3. The method of claim 1, wherein the at least one tensile sheet is non-woven.

4. The method of claim 2, wherein the at least one tensile sheet consists of a plurality of fibers.

5. The method of claim 4, wherein the plurality of fibers cooperate to define the plurality of strands.

6. The method of claim 1, wherein the plurality of strands includes a first plurality of parallel strands and a second plurality of strands that are perpendicular to the first plurality of parallel strands and the second plurality of strands are positioned on a first side of the first plurality of parallel strands.

7. The method of claim 1, wherein the plurality of strands includes a first plurality of strands, and the at least one tensile sheet includes a second plurality of strands extending across the first plurality of strands to define the plurality of holes extending from the first side of the tensile sheet to the second side of the tensile sheet.

8. The method of claim 1, wherein portions of the plurality of holes of the at least one tensile sheet is positioned between the first weld strip material and the first sheet and portions of the plurality of holes of the tensile sheet are positioned between the second weld strip material and the second sheet.

9. The method of claim 1, wherein the plurality of holes extend from the first weld strip material to the second weld strip material.

10. The method of claim 1, wherein the first and second weld strip materials include longitudinal edges and a portion of the at least one tensile sheet has portions that extend in a direction perpendicular to the longitudinal edges of the first and second weld strip materials.

11. The method of claim 1, wherein the at least one tensile sheet includes an outer perimeter having at least four sides, first and second sides of the four sides extend from a terminal end of the first weld strip material to a terminal end of the second weld strip material, and the at least one tensile sheet includes portions that extend from the first side to the second side of the outer perimeter.

12. A method for producing an inflatable mattress comprising the steps of
providing a first sheet made of weldable plastic and having a width and length suitable for a sleeping surface,
providing a second sheet made of weldable plastic and having a width and length suitable for a ground-contacting surface supportive of the first sheet,
providing a plurality of weld strip materials made of weldable plastic,
providing a non-woven sheet material having a first side and a second side,
assembling a plurality of tensioning structures by the steps of
positioning a first of the plurality of weld strip materials on the first and second sides of the non-woven sheet material such that the non-woven sheet material is captured by the first weld strip material, and
positioning a second of the plurality of weld strip materials on the first and second sides of the non-woven sheet material such that the non-woven sheet material is captured by the second weld strip material, the second weld strip material spaced from the first weld strip material,
welding the plurality of tensioning structures to the first sheet by welding at least one of the first and second weld strip materials to the first sheet,
welding the plurality of tensioning structures to the second sheet by welding the other of the first and second weld strip materials to the second sheet,
creating an inflatable chamber defined between the first and second sheets by the step of coupling the first sheet to the second sheet, and
providing a valve in communication with the inflatable chamber to facilitate inflation and deflation of the inflatable mattress.

13. The method of claim 12, wherein the non-woven sheet material is fabric.

14. The method of claim 12, wherein the non-woven sheet material includes a plurality of holes extending from the first side to the second side.

15. The method of claim 14, wherein the non-woven sheet material includes a plurality of strands cooperating to define the plurality of holes.

16. The method of claim 12, wherein the first and second weld strip materials are substantially parallel to the non-woven sheet material during the steps of positioning the first and second weld strip materials on the first and second sides of the non-woven sheet material.

17. The method of claim 12, wherein the non-woven sheet material is substantially planar prior to the steps of positioning the first and second weld strip materials on the first and second sides of the non-woven sheet material.

18. The method of claim 12, wherein the non-woven sheet material includes a plurality of V-shaped portions.

19. The method of claim 18, wherein the plurality of V-shaped portions includes a first plurality of V-shaped portions and a second plurality of V-shaped portions that are inverted relative to the first plurality of V-shaped portions.

20. The method of claim 18, wherein the first and second weld strip materials each include a respective pair of longitudinal edges and the V-shaped portions of non-woven sheet material extend between the first and second weld strip materials and traverse the respective pairs of longitudinal edges.

21. A method for producing an inflatable product comprising the steps of
providing a double-layer first sheet made of weldable plastic and having a first layer and a second layer,
providing a second sheet made of weldable plastic,
providing a plurality of weld strips made of weldable plastic, providing at least one tensile sheet having a first side and a second side,
assembling a plurality of tensioning structures after providing the at least one tensile sheet, the assembly step including the steps of
positioning a first pair of the plurality of weld strips on the first and second sides of the tensile sheet, and
positioning a second pair of the plurality of weld strips on the first and second sides of the tensile sheet, the first pair of weld strips spaced apart from the second pair of weld strips,
welding the plurality of tensioning structures to the first sheet by welding at least one of the first and second pairs of weld strips to the first sheet,
welding the plurality of tensioning structures to the second sheet by welding the other of the first and second pairs of weld strips to the second sheet,
creating a first inflatable chamber between the first and second sheets by the step of coupling the first and second sheets together,
creating a second inflatable chamber between the layers of the double-layer first sheet by the step of coupling the first and second layers together, and
providing a valve in communication with at least one of the first and second inflatable chambers to facilitate inflation and deflation of the inflatable product.

22. The method of claim 21, further comprising the step of advancing the tensile sheet relative to the first and second pairs of weld strips.

23. The method of claim 22, wherein the tensile sheet moves relative to a welder and at least one of the first and second pairs of weld strips are stationary relative to the welder during the advancing step.

24. A method for producing an inflatable product comprising the steps of
providing a first sheet made of weldable plastic,
providing a second sheet made of weldable plastic,
providing a plurality of weld strip materials made of weldable plastic,
providing a substantially planar tensile sheet material having a first side, a second side, and plurality of holes extending through the tensile sheet material from the first side to the second side,
assembling a plurality of tensioning structures by the steps of
positioning a first of the plurality of weld strip materials on the first and second sides of the tensile sheet material,
positioning a second of the plurality of weld strip materials on the first and second sides of the tensile sheet material, the first weld strip material spaced from the second weld strip material,
welding the plurality of tensioning structures to the first sheet by welding at least one of the first and second weld strip materials to the first sheet,
welding the plurality of tensioning structures to the second sheet by welding at least one of the first and second weld strip materials to the second sheet,
creating an inflatable chamber between the first and second sheets by the step of coupling the first sheet to the second sheet, and
providing a valve in communication with the inflatable chamber to facilitate inflation and deflation of the inflatable product.

25. The method of claim 24, further comprising the step of cutting the tensile sheet material into a plurality of tensile sheets.

26. The method of claim 25, wherein the cutting step occurs prior to the step of welding the first and second weld strip materials to the first and second sheets.

27. The method of claim 26, further comprising the step of cutting the plurality of weld strip materials into a plurality of weld strips.

28. The method of claim 27, wherein the step of cutting the plurality of weld strip materials into a plurality of weld strips occurs prior to the step of welding the plurality of tensioning structures to the first and second sheets.

29. The method of claim 1, further comprising forming the first sheet as a double layered construct.

30. The method of claim 29, wherein the inflatable chamber comprises a first inflatable chamber, further comprising forming a second inflatable chamber within the double layered construct of the first sheet.

31. The method of claim 29, wherein the first sheet includes a sleeping surface and the second sheet includes a ground-contacting surface.

32. The method of claim 29, wherein the first sheet comprises a middle layer, the inflatable product further comprising a top layer disposed above the middle layer.

33. The method of claim 32, wherein the middle layer and the top layer form a pattern air pockets therebetween.

34. The method of claim 32, wherein the first sheet includes a sleeping surface and the second sheet includes a ground-contacting surface.

35. The method of claim 1, wherein the first sheet provides a mattress-sized sleeping surface and the second sheet includes a ground-contacting surface.

36. The method of claim 1, further comprising:
fusing the first weld strip material from the first side to the second side of the tensile sheet through at least a portion of the plurality of holes to capture a first side of the tensile sheet; and
fusing the second weld strip material from the first side to the second side of the tensile sheet through at least a portion of the plurality of holes to capture a second side of the tensile sheet opposite the first side.

37. The method of claim 1, wherein:
the first weld strip material has a first outer longitudinal edge proximate respective first terminal ends of the plurality of strands, and a first inner longitudinal edge traversed by the plurality of strands; and
the second weld strip material has a second outer longitudinal edge proximate respective second terminal ends of the plurality of strands opposite the first terminal ends, and a second inner longitudinal edge traversed by the plurality of strands.

38. The method of claim 37, wherein the plurality of strands are woven together with an additional plurality of strands to form a fabric.

39. The method of claim 37, wherein the first and second inner longitudinal edges of the first and second weld strip materials are spaced from one another, such that the plurality of strands are exposed in a space between respective inner longitudinal edges of the first and second weld strip materials.

40. The method of claim 1, wherein:
the first weld strip material is in direct contact with the first sheet along at least a majority of a length of the first weld strip material; and
the second weld strip material is in direct contact with the second sheet along at least a majority of a length of the second weld strip material.

41. The method of claim 1, wherein the first and second sheets and the first and second weld strip materials are made of the same material.

42. The method of claim 1, wherein each of the plurality of strands are spaced apart from one another.

43. The method of claim 42, wherein the entire axial extent of each of the plurality of strands is spaced apart from the entire axial extent of each neighboring strand, such that the plurality of strands are evenly spaced apart.

44. The method of claim 42, wherein the plurality of strands are parallel to one another.

45. The method of claim 1, wherein, between the first and second weld strip materials, each tensioning structure has an area-to-weight ratio between 8,000 and 5,000,000 square centimeters per kilogram.

46. The inflatable mattress of claim 45, wherein the area-to-weight ratio is between 12,500 and 2,500,000 square centimeters per kilogram.

47. The method of claim 46, wherein the area-to-weight ratio is between 20,000 and 1,000,000 square centimeters per kilogram.

48. The method of claim 21, wherein the inflatable product is a mattress.

49. The method of claim 48, wherein the first sheet includes a sleeping surface and the second sheet includes a ground-contacting surface.

50. The method of claim 21, wherein the first sheet provides a mattress-sized sleeping surface and the second sheet includes a ground-contacting surface.

51. The method of claim 24, wherein the inflatable product is a mattress.

52. The method of claim 51, wherein the first sheet includes a sleeping surface and the second sheet includes a ground-contacting surface.

53. The method of claim 24, wherein the first sheet provides a mattress-sized sleeping surface and the second sheet includes a ground-contacting surface.

54. The method of claim 24, further comprising forming the first sheet as a double layered construct.

55. The method of claim 54, wherein the inflatable chamber comprises a first inflatable chamber, further comprising forming a second inflatable chamber within the double layered construct of the first sheet.

56. The method of claim 24, wherein the first sheet comprises a middle layer, the inflatable product further comprising a top layer disposed above the middle layer.

57. The method of claim 56, wherein the middle layer and the top layer form a pattern air pockets therebetween.

58. The method of claim 56, wherein the first sheet includes a sleeping surface and the second sheet includes a ground-contacting surface.

59. A method for producing an inflatable product comprising the steps of
providing a first sheet made of weldable plastic,
providing a second sheet made of weldable plastic,
providing a plurality of tensioning structures, each tensioning structure including
at least one tensile sheet having a first side, a second side, and plurality of holes extending through the tensile sheet from the first side to the second side and
a plurality of weld strip materials made of weldable plastic, the plurality of weld strip materials including
a first weld strip material disposed on the first and second sides of the tensile sheet such that the tensile sheet is captured by the first weld strip material, and
a second weld strip material disposed on the first and second sides of the tensile sheet such that the tensile sheet is captured by the second weld strip material, the second weld strip material spaced from the first weld strip material,
wherein, between the first and second weld strip materials, each tensioning structure has an area-to-weight ratio between 8,000 and 5,000,000 square centimeters per kilogram,
welding the plurality of tensioning structures to the first sheet by welding the first weld strip material to the first sheet,
welding the plurality of tensioning structures to the second sheet by welding the second weld strip material to the second sheet,
creating an inflatable chamber defined between the first and second sheets by the step of coupling the first sheet to the second sheet, and
providing a valve in communication with the inflatable chamber to facilitate inflation and deflation of the inflatable product.

60. The method of claim 3, wherein the non-woven sheet material is fabric.

61. The method of claim 3, wherein the non-woven sheet material includes the plurality of strands, which cooperate to define the plurality of holes.

62. The method of claim 3, wherein the first and second weld strip materials are substantially parallel to the non-woven sheet material when the first and second weld strip materials are disposed on the first and second sides of the non-woven sheet material.

63. The method of claim 3, wherein the non-woven sheet material is substantially planar prior to the first and second weld strip materials being positioned on the first and second sides of the tensile sheet.

64. The method of claim 3, wherein the non-woven sheet material includes a plurality of V-shaped portions.

65. The method of claim 64, wherein the plurality of V-shaped portions includes a first plurality of V-shaped portions and a second plurality of V-shaped portions that are inverted relative to the first plurality of V-shaped portions.

66. The method of claim 64, wherein the first and second weld strip materials each include a respective pair of longitudinal edges and the V-shaped portions of non-woven sheet material extend between the first and second weld strip materials and traverse the respective pairs of longitudinal edges.

67. The method of claim 1, further comprising the step of advancing the tensile sheet relative to the first and second weld strip materials.

68. The method of claim 67, wherein the tensile sheet moves relative to a welder and at least one of the first and second weld strip materials are stationary relative to the welder during the advancing step.

69. The method of claim 1, further comprising the step of cutting the tensile sheet material into a plurality of tensile sheets.

70. The method of claim 69, wherein the cutting step occurs prior to the step of welding the first and second weld strip materials to the first and second sheets.

71. The method of claim 70, further comprising the step of cutting the plurality of weld strip materials into a plurality of weld strips.

72. The method of claim 71, wherein the step of cutting the plurality of weld strip materials into a plurality of weld strips occurs prior to the step of welding the plurality of tensioning structures to the first and second sheets.

73. The method of claim 1, wherein the inflatable product is a mattress.

74. The method of claim 12, further comprising the step of providing a side wall, wherein the step of coupling the first sheet to the second sheet includes the step of coupling the side wall to the first sheet and coupling the side wall to the second sheet.

75. The method of claim 12, wherein the non-woven sheet material consists of a plurality of fibers.

76. The method of claim 75, wherein the plurality of fibers cooperate to define the plurality of strands.

77. The method of claim 12, wherein the first and second weld strip materials include longitudinal edges and a portion of the non-woven sheet material has portions that extend in a direction perpendicular to the longitudinal edges of the first and second weld strip materials.

78. The method of claim 12, wherein the non-woven sheet material includes an outer perimeter having at least four sides, first and second sides of the four sides extend from a terminal end of the first weld strip material to a terminal end of the second weld strip material, and the at least one tensile sheet includes portions that extend from the first side to the second side of the outer perimeter.

79. The method of claim 12, further comprising the step of advancing the non-woven sheet material relative to the first and second weld strip materials.

80. The method of claim 79, wherein the non-woven sheet material moves relative to a welder and at least one of the first and second weld strip materials are stationary relative to the welder during the advancing step.

81. The method of claim 12, further comprising the step of cutting the non-woven sheet material into a plurality of tensile sheets.

82. The method of claim 81, wherein the cutting step occurs prior to the step of welding the first and second weld strip materials to the first and second sheets.

83. The method of claim 82, further comprising the step of cutting the plurality of weld strip materials into a plurality of weld strips.

84. The method of claim 83, wherein the step of cutting the plurality of weld strip materials into a plurality of weld strips occurs prior to the step of welding the plurality of tensioning structures to the first and second sheets.

85. The method of claim 12, further comprising forming the first sheet as a double layered construct.

86. The method of claim 85, wherein the inflatable chamber comprises a first inflatable chamber, further comprising forming a second inflatable chamber within the double layered construct of the first sheet.

87. The method of claim 12, wherein the first sheet includes a sleeping surface and the second sheet includes a ground-contacting surface.

88. The method of claim 12, wherein the first sheet provides a mattress-sized sleeping surface and the second sheet includes a ground-contacting surface.

89. The method of claim 12, wherein the first sheet comprises a middle layer, the inflatable product further comprising a top layer disposed above the middle layer.

90. The method of claim 89, wherein the middle layer and the top layer form a pattern air pockets therebetween.

91. The method of claim 89, wherein the first sheet includes a sleeping surface and the second sheet includes a ground-contacting surface.

92. The method of claim 14, further comprising:
fusing the first weld strip material from the first side to second side of the non-woven sheet material through at least a portion of the plurality of holes to capture a first side of the tensile sheet; and
fusing the second weld strip material from the first side to the second side of the non-woven sheet material through at least a portion of the plurality of holes to capture a second side of the non-woven sheet material opposite the first side.

93. The method of claim 12, wherein:
the first weld strip material has a first outer longitudinal edge proximate respective first terminal ends of the non-woven sheet material, and a first inner longitudinal edge traversed by the non-woven sheet material; and
the second weld strip material has a second outer longitudinal edge proximate respective second terminal ends of the non-woven sheet material opposite the first terminal ends, and a second inner longitudinal edge traversed by the non-woven sheet material.

94. The method of claim 93, wherein the non-woven sheet material forms a fabric.

95. The method of claim 93, wherein the first and second inner longitudinal edges of the first and second weld strip materials are spaced from one another, such that the non-woven sheet material is exposed in a space between respective inner longitudinal edges of the first and second weld strip materials.

96. The method of claim 12, wherein:
the first weld strip material is in direct contact with the first sheet along at least a majority of a length of the first weld strip material; and
the second weld strip material is in direct contact with the second sheet along at least a majority of a length of the second weld strip material.

97. The method of claim 12, wherein the first and second sheets and the first and second weld strip materials are made of the same material.

98. The method of claim 12, wherein, between the first and second weld strip materials, each tensioning structure has an area-to-weight ratio between 8,000 and 5,000,000 square centimeters per kilogram.

99. The inflatable mattress of claim 98, wherein the area-to-weight ratio is between 12,500 and 2,500,000 square centimeters per kilogram.

100. The method of claim 99, wherein the area-to-weight ratio is between 20,000 and 1,000,000 square centimeters per kilogram.

101. The method of claim 21, further comprising the step of providing a side wall, wherein the step of coupling the first sheet to the second sheet includes the step of coupling the side wall to the first sheet and coupling the side wall to the second sheet.

102. The method of claim 21, wherein the at least one tensile sheet is non-woven.

103. The method of claim 21, wherein the at least one tensile sheet consists of a plurality of fibers.

104. The method of claim 103, wherein the plurality of fibers cooperate to define the plurality of strands.

105. The method of claim 21, wherein the tensile sheet includes a first plurality of parallel strands and a second plurality of strands that are perpendicular to the first plurality of parallel strands and the second plurality of strands are positioned on a first side of the first plurality of parallel strands.

106. The method of claim 21, wherein the tensile sheet includes a first plurality of strands, and the at least one tensile sheet includes a second plurality of strands extending across the first plurality of strands to define the plurality of holes extending from the first side of the tensile sheet to the second side of the tensile sheet.

107. The method of claim 21, wherein the tensile sheet includes a plurality of holes therethrough, portions of the plurality of holes of the at least one tensile sheet being positioned between the first weld strip material and the first sheet and portions of the plurality of holes of the tensile sheet being positioned between the second weld strip material and the second sheet.

108. The method of claim 21, wherein a plurality of holes extend from the first weld strip material to the second weld strip material.

109. The method of claim 21, wherein the first and second weld strip materials include longitudinal edges and a portion of the at least one tensile sheet has portions that extend in a direction perpendicular to the longitudinal edges of the first and second weld strip materials.

110. The method of claim 21, wherein the at least one tensile sheet includes an outer perimeter having at least four sides, first and second sides of the four sides extend from a terminal end of the first weld strip material to a terminal end of the second weld strip material, and the at least one tensile sheet includes portions that extend from the first side to the second side of the outer perimeter.

111. The method of claim 102, wherein the non-woven sheet material is fabric.

112. The method of claim 102, wherein the non-woven sheet material includes a plurality of holes extending from the first side to the second side.

113. The method of claim 102, wherein the non-woven sheet material includes a plurality of strands cooperating to define the plurality of holes.

114. The method of claim 102, wherein the first and second weld strip materials are substantially parallel to the non-woven sheet material during the steps of positioning the first and second weld strip materials on the first and second sides of the non-woven sheet material.

115. The method of claim 102, wherein the non-woven sheet material is substantially planar prior to the steps of positioning the first and second weld strip materials on the first and second sides of the non-woven sheet material.

116. The method of claim 102, wherein the non-woven sheet material includes a plurality of V-shaped portions.

117. The method of claim 116, wherein the plurality of V-shaped portions includes a first plurality of V-shaped portions and a second plurality of V-shaped portions that are inverted relative to the first plurality of V-shaped portions.

118. The method of claim 116, wherein the first and second weld strip materials each include a respective pair of longitudinal edges and the V-shaped portions of non-woven sheet material extend between the first and second weld strip materials and traverse the respective pairs of longitudinal edges.

119. The method of claim 21, further comprising the step of cutting the tensile sheet material into a plurality of tensile sheets.

120. The method of claim 119, wherein the cutting step occurs prior to the step of welding the first and second weld strip materials to the first and second sheets.

121. The method of claim 120, further comprising the step of cutting the plurality of weld strip materials into a plurality of weld strips.

122. The method of claim 121, wherein the step of cutting the plurality of weld strip materials into a plurality of weld strips occurs prior to the step of welding the plurality of tensioning structures to the first and second sheets.

123. The method of claim 21, wherein the first sheet comprises a middle layer, the inflatable product further comprising a top layer disposed above the middle layer.

124. The method of claim 123, wherein the middle layer and the top layer form a pattern air pockets therebetween.

125. The method of claim 123, wherein the first sheet includes a sleeping surface and the second sheet includes a ground-contacting surface.

126. The method of claim 21, wherein the tensile sheet has a plurality of holes therethrough, the method further comprising:
fusing the first weld strip material from the first side to the second side of the tensile sheet through at least a portion of the plurality of holes to capture a first side of the tensile sheet; and
fusing the second weld strip material from the first side to the second side of the tensile sheet through at least a portion of the plurality of holes to capture a second side of the tensile sheet opposite the first side.

127. The method of claim 21, wherein:
the tensile sheet has a plurality of strands;
the first pair of weld strips have a first outer longitudinal edge proximate respective first terminal ends of the plurality of strands, and a first inner longitudinal edge traversed by the plurality of strands; and
the second pair of weld strips have a second outer longitudinal edge proximate respective second terminal ends of the plurality of strands opposite the first terminal ends, and a second inner longitudinal edge traversed by the plurality of strands.

128. The method of claim 127, wherein the plurality of strands are woven together with an additional plurality of strands to form a fabric.

129. The method of claim 127, wherein the first and second inner longitudinal edges of the first and second pairs of weld strips are spaced from one another, such that the plurality of strands are exposed in a space between respective inner longitudinal edges of the first and second pairs of weld strips.

130. The method of claim 21, wherein:
the first pair of weld strips is in direct contact with the first sheet along at least a majority of a length of the first weld strip material; and
the second pair of weld strips is in direct contact with the second sheet along at least a majority of a length of the second weld strip material.

131. The method of claim 21, wherein the first and second sheets and the first and second weld strip materials are made of the same material.

132. The method of claim 21, wherein the tensile sheet has a plurality of strands, each of the plurality of strands being spaced apart from one another.

133. The method of claim 132, wherein the entire axial extent of each of the plurality of strands is spaced apart from the entire axial extent of each neighboring strand, such that the plurality of strands are evenly spaced apart.

134. The method of claim 132, wherein the plurality of strands are parallel to one another.

135. The method of claim 21, wherein, between the first and second pairs of weld strips, each tensioning structure has an area-to-weight ratio between 8,000 and 5,000,000 square centimeters per kilogram.

136. The inflatable mattress of claim 135, wherein the area-to-weight ratio is between 12,500 and 2,500,000 square centimeters per kilogram.

137. The method of claim 136, wherein the area-to-weight ratio is between 20,000 and 1,000,000 square centimeters per kilogram.

138. The method of claim 24, further comprising the step of providing a side wall, wherein the step of coupling the first sheet to the second sheet includes the step of coupling the side wall to the first sheet and coupling the side wall to the second sheet.

139. The method of claim 24, wherein the tensile sheet material is non-woven.

140. The method of claim 24, wherein the tensile sheet material consists of a plurality of fibers.

141. The method of claim 140, wherein the plurality of fibers cooperate to define a plurality of strands of the tensile sheet material, the plurality of strands arranged to provide a substantially uniform height among the plurality of tensioning structures throughout the inflatable product.

142. The method of claim 24, wherein the plurality of strands includes a first plurality of parallel strands and a second plurality of strands that are perpendicular to the first plurality of parallel strands and the second plurality of strands are positioned on a first side of the first plurality of parallel strands.

143. The method of claim 24, wherein the tensile sheet material includes a first plurality of strands, and the tensile sheet material includes a second plurality of strands extending across the first plurality of strands to define the plurality of holes extending from the first side of the tensile sheet to the second side of the tensile sheet.

144. The method of claim 24, wherein portions of the plurality of holes of the tensile sheet material are positioned between the first weld strip material and the first sheet and portions of the plurality of holes of the tensile sheet are positioned between the second weld strip material and the second sheet.

145. The method of claim 24, wherein the plurality of holes extend from the first weld strip material to the second weld strip material.

146. The method of claim 24, wherein the first and second weld strip materials include longitudinal edges and a portion of the tensile sheet material has portions that extend in a direction perpendicular to the longitudinal edges of the first and second weld strip materials.

147. The method of claim 24, wherein the tensile sheet material includes an outer perimeter having at least four sides, first and second sides of the four sides extend from a terminal end of the first weld strip material to a terminal end of the second weld strip material, and the tensile sheet material includes portions that extend from the first side to the second side of the outer perimeter.

148. The method of claim 139, wherein the non-woven sheet material is fabric.

149. The method of claim 139, wherein the non-woven sheet material includes a plurality of strands cooperating to define the plurality of holes.

150. The method of claim 139, wherein the first and second weld strip materials are substantially parallel to the non-woven sheet material during the steps of positioning the first and second weld strip materials on the first and second sides of the non-woven sheet material.

151. The method of claim 139, wherein the non-woven sheet material includes a plurality of V-shaped portions.

152. The method of claim 151, wherein the plurality of V-shaped portions includes a first plurality of V-shaped portions and a second plurality of V-shaped portions that are inverted relative to the first plurality of V-shaped portions.

153. The method of claim 151, wherein the first and second weld strip materials each include a respective pair of longitudinal edges and the V-shaped portions of non-woven sheet material extend between the first and second weld strip materials and traverse the respective pairs of longitudinal edges.

154. The method of claim 24, further comprising the step of advancing the tensile sheet material relative to the first and second weld strip materials.

155. The method of claim 154, wherein the tensile sheet material moves relative to a welder and at least one of the first and second weld strip materials are stationary relative to the welder during the advancing step.

156. The method of claim 24, further comprising:
fusing the first weld strip material from the first side to the second side of the tensile sheet material through at least a portion of the plurality of holes to capture a first side of the tensile sheet; and
fusing the second weld strip material from the first side to the second side of the tensile sheet material through at least a portion of the plurality of holes to capture a second side of the tensile sheet opposite the first side.

157. The method of claim 24, wherein:
the tensile sheet material has a plurality of strands;
the first weld strip material has a first outer longitudinal edge proximate respective first terminal ends of the plurality of strands, and a first inner longitudinal edge traversed by the plurality of strands; and
the second weld strip material has a second outer longitudinal edge proximate respective second terminal ends of the plurality of strands opposite the first terminal ends, and a second inner longitudinal edge traversed by the plurality of strands.

158. The method of claim 157, wherein the plurality of strands are woven together with an additional plurality of strands to form a fabric.

159. The method of claim 157, wherein the first and second inner longitudinal edges of the first and second weld strip materials are spaced from one another, such that the plurality of strands are exposed in a space between respective inner longitudinal edges of the first and second weld strip materials.

160. The method of claim 24, wherein:
the first weld strip material is in direct contact with the first sheet along at least a majority of a length of the first weld strip material; and
the second weld strip material is in direct contact with the second sheet along at least a majority of a length of the second weld strip material.

161. The method of claim 24, wherein the first and second sheets and the first and second weld strip materials are made of the same material.

162. The method of claim 24, wherein the tensile sheet has a plurality of strands, each of the plurality of strands being spaced apart from one another.

163. The method of claim 162, wherein the entire axial extent of each of the plurality of strands is spaced apart from the entire axial extent of each neighboring strand, such that the plurality of strands are evenly spaced apart.

164. The method of claim 162, wherein the plurality of strands are parallel to one another.

165. The method of claim 24, wherein, between the first and second weld strip materials, each tensioning structure has an area-to-weight ratio between 8,000 and 5,000,000 square centimeters per kilogram.

166. The inflatable mattress of claim 165, wherein the area-to-weight ratio is between 12,500 and 2,500,000 square centimeters per kilogram.

167. The method of claim 165, wherein the area-to-weight ratio is between 20,000 and 1,000,000 square centimeters per kilogram.

168. The method of claim 59, further comprising the step of providing a side wall, wherein the step of coupling the first sheet to the second sheet includes the step of coupling the side wall to the first sheet and coupling the side wall to the second sheet.

169. The method of claim 59, wherein the at least one tensile sheet is non-woven.

170. The method of claim 59, wherein the at least one tensile sheet consists of a plurality of fibers.

171. The method of claim 170, wherein the plurality of fibers cooperate to define a plurality of strands of at least one tensile sheet, the plurality of strands arranged to provide a substantially uniform height among the plurality of tensioning structures throughout the inflatable product.

172. The method of claim 59, wherein at least one tensile sheet includes a first plurality of parallel strands and a second plurality of strands that are perpendicular to the first plurality of parallel strands and the second plurality of strands are positioned on a first side of the first plurality of parallel strands.

173. The method of claim 59, wherein at least one tensile sheet includes a first plurality of strands, and a second plurality of strands extending across the first plurality of strands to define the plurality of holes extending from the first side of the at least one tensile sheet to the second side of the at least one tensile sheet.

174. The method of claim 59, wherein portions of the plurality of holes of the at least one tensile sheet are positioned between the first weld strip material and the first sheet and portions of the plurality of holes of the tensile sheet are positioned between the second weld strip material and the second sheet.

175. The method of claim 59, wherein the plurality of holes extend from the first weld strip material to the second weld strip material.

176. The method of claim 59, wherein the first and second weld strip materials include longitudinal edges and a portion of the at least one tensile sheet has portions that extend in a direction perpendicular to the longitudinal edges of the first and second weld strip materials.

177. The method of claim 59, wherein the at least one tensile sheet includes an outer perimeter having at least four sides, first and second sides of the four sides extend from a terminal end of the first weld strip material to a terminal end of the second weld strip material, and the at least one tensile sheet includes portions that extend from the first side to the second side of the outer perimeter.

178. The method of claim 169, wherein the non-woven sheet material is fabric.

179. The method of claim 169, wherein the non-woven sheet material includes a plurality of strands cooperating to define the plurality of holes.

180. The method of claim 169, wherein the first and second weld strip materials are substantially parallel to the non-woven sheet material during the steps of positioning the first and second weld strip materials on the first and second sides of the non-woven sheet material.

181. The method of claim 169, wherein the non-woven sheet material is substantially planar prior to the steps of positioning the first and second weld strip materials on the first and second sides of the non-woven sheet material.

182. The method of claim 169, wherein the non-woven sheet material includes a plurality of V-shaped portions.

183. The method of claim 182, wherein the plurality of V-shaped portions includes a first plurality of V-shaped portions and a second plurality of V-shaped portions that are inverted relative to the first plurality of V-shaped portions.

184. The method of claim 182, wherein the first and second weld strip materials each include a respective pair of longitudinal edges and the V-shaped portions of non-woven sheet material extend between the first and second weld strip materials and traverse the respective pairs of longitudinal edges.

185. The method of claim 59, further comprising the step of advancing the at least one tensile sheet relative to the first and second weld strip materials.

186. The method of claim 59, wherein the at least one tensile sheet moves relative to a welder and at least one of the first and second weld strip materials are stationary relative to the welder during the advancing step.

187. The method of claim 59, further comprising the step of cutting the at least one tensile sheet into a plurality of tensile sheets.

188. The method of claim 187, wherein the cutting step occurs prior to the step of welding the first and second weld strip materials to the first and second sheets.

189. The method of claim 188, further comprising the step of cutting the plurality of weld strip materials into a plurality of weld strips.

190. The method of claim 189, wherein the step of cutting the plurality of weld strip materials into a plurality of weld strips occurs prior to the step of welding the plurality of tensioning structures to the first and second sheets.

191. The method of claim 59, further comprising forming the first sheet as a double layered construct.

192. The method of claim 191, wherein the inflatable chamber comprises a first inflatable chamber, further comprising forming a second inflatable chamber within the double layered construct of the first sheet.

193. The method of claim 59, wherein the inflatable product is a mattress.

194. The method of claim 59, wherein the first sheet includes a sleeping surface and the second sheet includes a ground-contacting surface.

195. The method of claim 59, wherein the first sheet provides a mattress-sized sleeping surface and the second sheet includes a ground-contacting surface.

196. The method of claim 59, wherein the first sheet comprises a middle layer, the inflatable product further comprising a top layer disposed above the middle layer.

197. The method of claim 196, wherein the middle layer and the top layer form a pattern air pockets therebetween.

198. The method of claim 196, wherein the first sheet includes a sleeping surface and the second sheet includes a ground-contacting surface.

199. The method of claim 59, further comprising:
fusing the first weld strip material from the first side to the second side of the tensile sheet through at least a portion of the plurality of holes to capture a first side of the at least one tensile sheet; and
fusing the second weld strip material from the first side to the second side of the tensile sheet through at least a portion of the plurality of holes to capture a second side of the at least one tensile sheet opposite the first side.

200. The method of claim 59, wherein:
the at least one tensile sheet has a plurality of strands;
the first weld strip material has a first outer longitudinal edge proximate respective first terminal ends of the plurality of strands, and a first inner longitudinal edge traversed by the plurality of strands; and the second weld strip material has a second outer longitudinal edge proximate respective second terminal ends of the plurality of strands opposite the first terminal ends, and a second inner longitudinal edge traversed by the plurality of strands.

201. The method of claim 200, wherein the plurality of strands are woven together with an additional plurality of strands to form a fabric.

202. The method of claim 200, wherein the first and second inner longitudinal edges of the first and second weld strip materials are spaced from one another, such that the plurality of strands are exposed in a space between respective inner longitudinal edges of the first and second weld strip materials.

203. The method of claim 59, wherein:

the first weld strip material is in direct contact with the first sheet along at least a majority of a length of the first weld strip material; and the second weld strip material is in direct contact with the second sheet along at least a majority of a length of the second weld strip material.

204. The method of claim 59, wherein the first and second sheets and the first and second weld strip materials are made of the same material.

205. The method of claim 59, wherein the tensile sheet has a plurality of strands, each of the plurality of strands being spaced apart from one another.

206. The method of claim 205, wherein the entire axial extent of each of the plurality of strands is spaced apart from the entire axial extent of each neighboring strand, such that the plurality of strands are evenly spaced apart.

207. The method of claim 205, wherein the plurality of strands are parallel to one another.

208. The inflatable mattress of claim 59, wherein the area-to-weight ratio is between 12,500 and 2,500,000 square centimeters per kilogram.

209. The method of claim 208, wherein the area-to-weight ratio is between 20,000 and 1,000,000 square centimeters per kilogram.

* * * * *